(12) United States Patent
Horio et al.

(10) Patent No.: US 8,411,972 B2
(45) Date of Patent: Apr. 2, 2013

(54) INFORMATION PROCESSING DEVICE, METHOD, AND PROGRAM

(75) Inventors: Kenichi Horio, Kawasaki (JP); Kazuki Matsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/303,956

(22) Filed: Nov. 23, 2011

(65) Prior Publication Data

US 2012/0141038 A1    Jun. 7, 2012

(30) Foreign Application Priority Data

Dec. 3, 2010    (JP) .................................. 2010-269899

(51) Int. Cl.
*G06K 9/36*    (2006.01)

(52) U.S. Cl. .......................... 382/232; 382/236; 382/239

(58) Field of Classification Search .................. 382/232, 382/233, 226, 239, 103, 107, 118; 348/384.1; 345/204, 629; 358/1.15, 1.18, 143, 426.01; 375/E7.051, 240.16
See application file for complete search history.

(56) References Cited

U.S. PATENT DOCUMENTS 7,373,001 B2 *    5/2008    Kondo et al. ................. 382/232
8,063,894 B2 *    11/2011   Yamada ........................ 345/204

FOREIGN PATENT DOCUMENTS

JP          2007-505580 A     3/2007
WO          WO-2005/029864    3/2005

* cited by examiner

*Primary Examiner* — Anh Hong Do
(74) *Attorney, Agent, or Firm* — Fujitsu Patent Center

(57) ABSTRACT

An information processing device includes a storage storing information indicating a first region subjected to moving-image compression and transmission; an identification unit identifying a second region where the update amount of an image is greater than or equal to a threshold value; a determination unit determining whether the image of the second region being associated with the moving image of the first region is to be transmitted, based on an overlapping relationship between the first region and the second region; and a transmission unit transmitting an image of a region including a portion of the second region, following the transmission of the image of the first region, with the image of the region being subjected to moving-image compression, and transmitting information indicating a display position of the image subjected to moving-image compression, when the second region is to be transmitted with being associated with the first region is determined.

13 Claims, 27 Drawing Sheets

FIG. 10

| REGION ID | x | y | w | h | ENCODER | CONTINUOUS-USE-DESTINATION REGION ID | nx | ny |
|---|---|---|---|---|---|---|---|---|
| 1 | 0 | 0 | 200 | 200 | 0x012fafa | 1 | 50 | 50 |
| 2 | 500 | 0 | 100 | 100 | 0x013fafa | NO | | |
| 3 | 0 | 500 | 100 | 100 | 0x014fafa | 2 | 0 | 300 |

PREVIOUS REGION MANAGEMENT DATA

| REGION ID | x | y | w | h | ENCODER | n | ENCODE COUNT | xo | yo | wo | ho |
|---|---|---|---|---|---|---|---|---|---|---|---|
| 1 | 50 | 50 | 200 | 200 | 0x012fafa | 5 | 1 | 100 | 100 | 150 | 150 |
| | | | | | | | | | | | |

| REGION ID | x | y | w | h | ENCODER | INTEGRATION INSTRUCTION TIME[ms] |
|---|---|---|---|---|---|---|
| 1 | 0 | 0 | 200 | 200 | 0x012fafa | |
| 2 | 200 | 0 | 100 | 300 | 0x013fafa | 120191 |
| 3 | 0 | 200 | 200 | 100 | 0x014fafa | |
| 4 | 0 | 800 | 100 | 50 | 0x015fafa | |

⇩

144

| REGION ID | x | y | w | h | ENCODER | INTEGRATION INSTRUCTION TIME |
|---|---|---|---|---|---|---|
| 5 | 0 | 0 | 300 | 300 | 0x016fafa | |
| 4 | 0 | 800 | 100 | 50 | 0x015fafa | |
| | | | | | | |
| | | | | | | |

# INFORMATION PROCESSING DEVICE, METHOD, AND PROGRAM

CROSS-REFERENCE TO RELATED APPLICATION

This application is based upon and claims the benefit of priority of the prior Japanese Patent Application No. 2010-269899 filed on Dec. 3, 2010, the entire contents of which are incorporated herein by reference.

FIELD

The embodiments discussed herein are related to an information processing device, an information processing method, and an information processing program.

BACKGROUND

In recent years, there have been known systems (Systems) each of which is called a thin client (Thin Client) and in each of which a number of functions installed in a client (Client) device is kept as low as practicable and resources (Resources) such as an application (Application), a file (File), and the like are managed on a server (Server) device side.

In the thin client system, a client is caused to display a processing result obtained by the execution of processing by the server device or data held in the server device, and the thin client system operates in such a manner that the client mainly executes the processing or holds the data.

As an example of an execution method for a task executed in the thin client system, a method or the like may be cited in which an application relating to a material creation task, a mail management task, or the like is caused to be executed in the server device and a client is caused to display the processing result of the application.

In recent years, in addition to the material creation task and the mail management task, tasks caused to be executed by the thin client system are expected to expand into a task dealing with high-resolution images such as in a Computer-Aided Design (CAD) creation task or the like or a moving-image reproduction/editing task or the like.

Related-art techniques are disclosed in Japanese National Publication of International Patent Application No. 2007-505580.

However, when a task dealing with high-resolution images, such as the CAD creation task, a task dealing with moving images, or the like, is caused to be executed, since the amount of information transferred from the server device to the client device increases, there occurs a problem that a response to an operation executed in the client device is delayed.

In addition, the delay of the response is common when the amount of information transferred between the client device and the server device increases in the thin client system at the time of screen updating, and is not limited to a case in which images or moving images are handled.

SUMMARY

According to an aspect of an embodiment, an information processing device includes a storage unit storing information indicating a first region subjected to moving-image compression and transmission; an identification unit identifying a second region where the update amount of an image is greater than or equal to a threshold value; a determination unit determining whether the image of the second region being associated with the moving image of the first region is to be transmitted, based on of an overlapping relationship between the first region and the second region; and a transmission unit transmitting an image of a region including at least a portion of the second region, following the transmission of image of the first region, with the image of the region being subjected to moving-image compression, and transmitting information indicating a display position of the image subjected to moving-image compression, when it is determined that the second region is to be transmitted with being associated with the first region.

The object and advantages of the invention will be realized and attained at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram explaining the content of previous region management data stored in a previous region management data storage unit;

FIG. 20 is a diagram illustrating an example of a region management table included in a server device of a third embodiment;

FIG. 24 is a diagram illustrating a region management table of the fourth embodiment;

DESCRIPTION OF EMBODIMENTS

Hereinafter, embodiments will be described in detail with reference to drawings.

First, an information processing device of an embodiment will be described, and subsequently, the embodiment will be described more specifically.

First Embodiment

Figure 1:
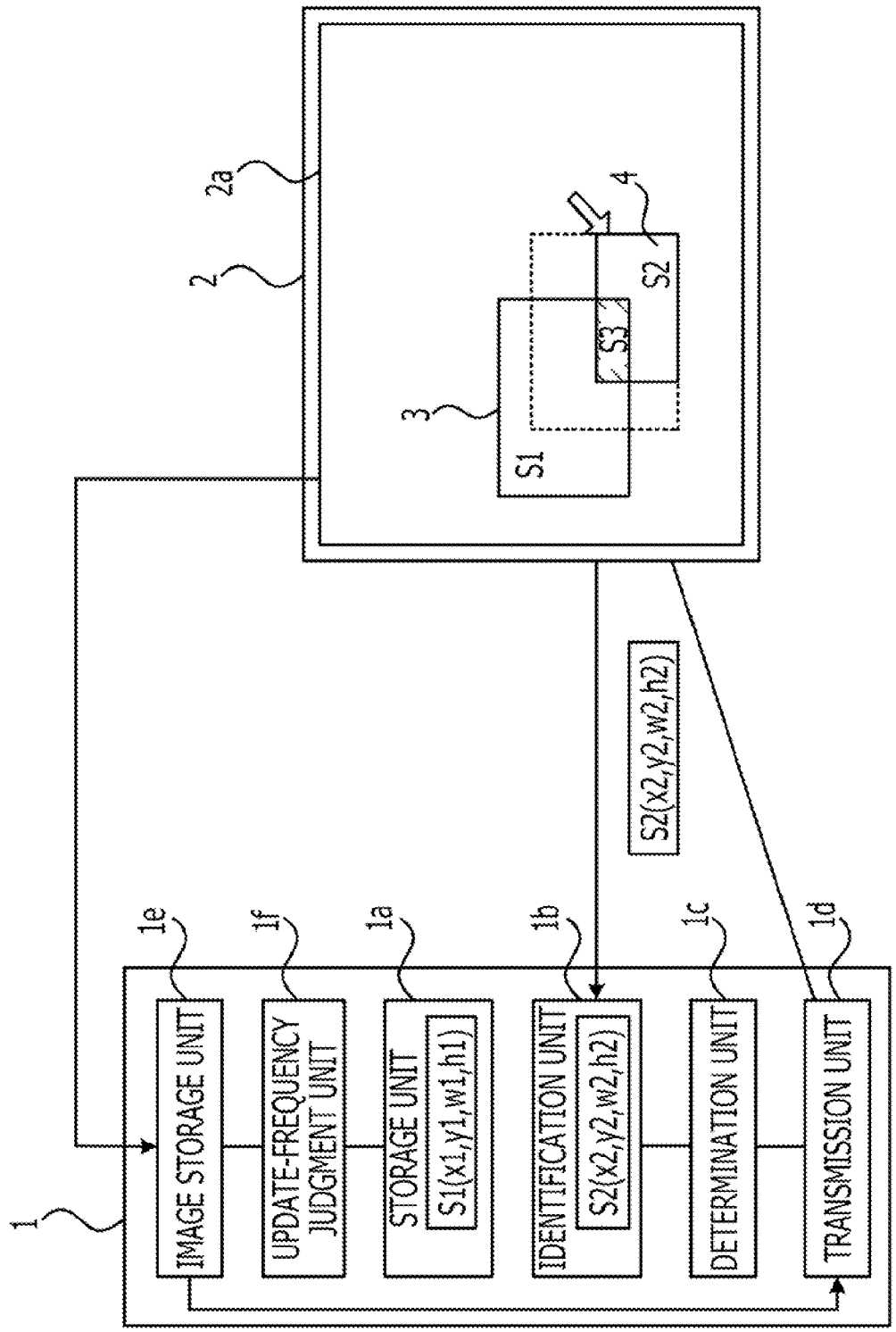
FIG. 1 is a diagram illustrating a summary of an information processing device of a first embodiment.

FIG. 1 is a diagram illustrating the summary of an information processing device of a first embodiment.

An information processing device (computer) 1 of the embodiment includes a function for transmitting a position at which an image is to be displayed to a client device 2 when requesting a display unit 2a included in the client device 2 to display the image.

This information processing device 1 includes a storage unit 1a, an identification unit 1b, a determination unit 1c, and a transmission unit 1d.

The storage unit 1a stores therein information indicating a first region subjected to moving-image compression and transmission. In FIG. 1, as an example, as a result of the fact that images displayed in the display unit 2a are compared between predetermined frames, it is stored that a region 3 is the first region subjected to moving-image compression and transmission. At this time, the storage unit 1a stores therein information (a coordinate x1, a coordinate y1, a width w1, a height h1 in FIG. 1) for identifying the display part of the region 3 in the display unit 2a associated with an identifier "S1" identifying the region 3. In addition, for example, the coordinate x1 and the coordinate y1 are xy coordinates when the top left of the display unit 2a is regarded as an original point (0, 0), the width w1 is the length of the region 3 in a left-right direction within FIG. 1, and the height h1 is the length of the region 3 in an up-down direction within FIG. 1.

Here, the information processing device 1 may include an image storage unit 1e storing therein a plurality of images that are targets for comparison, and an update-frequency judgment unit 1f. The image storage unit 1e stores therein predetermined frames of images displayed in the display unit 2a in the client device 2. The update-frequency judgment unit 1f compares a plurality of images between predetermined frames, and judges a part where the number of times the part is updated in an image is greater than or equal to a constant value. In addition, the update-frequency judgment unit 1f sets the judged part to the first region. For example, as a judgment method for a part where the frequency of update is greater than or equal to the constant value, the update-frequency judgment unit 1f segments an image stored in the image storage unit 1e into a plurality of regions. In addition, the frequency of update between frames is judged with respect to each region. In addition, a part where the frequency of update exceeds a preliminarily prepared threshold value is judged to be a part where the number of times the part is updated is greater than or equal to a constant value.

The identification unit 1b identifies a second region where the update amount of an image within a predetermined time period is greater than or equal to a threshold value, in an image to be transmitted next.

In the display unit 2a in FIG. 1, a situation is illustrated in which a user of the client device 2 has moved an imaged displayed in the region 3 to a region 4. In FIG. 1, a rectangle surrounded by a dotted line indicates a rectangle having the same size as the region 3. At this time, the identification unit 1b identifies the region 4 as the second region, and identifies information (a coordinate x2, a coordinate y2, a width w2, and a height h2 in FIG. 1) for identifying the region 4.

On the basis of an overlapping relationship between the first region and the second region, the determination unit 1c determines whether or not an image within the second region being associated with a moving image in the first region is to be transmitted. For example, it is possible to perform this determination as follows.

In FIG. 1, the determination unit 1c compares the information that is used for identifying the region 3 and stored in the storage unit 1a with the information for identifying the region 4 identified by the identification unit 1b, and determines whether or not the position coordinates thereof and the sizes thereof (widths and heights) match. In addition, when these match, it is determined that the image within the second region being associated with the moving image in the first region is to be transmitted. In addition, as another determination method, the determination unit 1c determines whether or not the sizes thereof (widths and heights) match and a region (a region S3 in FIG. 1) in which the region 3 and the region 4 overlap with each other exists. In addition, when the region exists, it is determined that the image within the second region being associated with the moving image in the first region is to be transmitted. Furthermore, as another determination method, the determination unit 1c determines whether or not the region 4 is smaller in size (width and height) than the region 3 and the communication amount of image data becomes small if an image in the first region is continuously transmitted. In addition, when it is determined that the communication amount of image data becomes small, it is determined that the image within the second region being associated with the moving image in the first region is to be transmitted.

When it is determined that the image within the second region being associated with the moving image in the first region is to be transmitted, the transmission unit 1d transmits the image of a region including at least a portion of the second region with subjecting the image of the region to moving-image compression, following the image in the first region, and transmits information indicating the display position of the image subjected to the moving image compression. In FIG. 1, when it is determined that the image displayed in the region 3 is to be continuously transmitted as the image in the region 4, the information (the coordinate x2, the coordinate y2, the width w2, and the height h2) indicating the display position of the image in the region 4 is transmitted to the client device 2 with being added to moving-image compression data.

When having received the information indicating the display position of the image in the second region and the moving-image compression data, transmitted by the transmission unit 1d, the client device 2 reproduces an image obtained by decompressing the moving-image compression data transmitted by the transmission unit 1d, at the display position of the image in the second region, identified by the information indicating the display position of the image in the second region.

According to this information processing device 1, for example, in a situation in which the first region frequently occurs at an arbitrary part in such a way as at the time of the reproduction of a moving image, at the time of the use of a CAD application, or the like, when a certain condition is met, an image in an updated region is continuously used. Accordingly, since it is possible to enhance data compression efficiency, it is possible to accelerate a response time to the operation of the user of the client device 2, as a result.

In addition, the information processing device 1 may be caused to include the following functions in addition to the above-mentioned function.

For example, the information processing device 1 may be caused to include a function for searching a combination where a data communication amount is supposed to become small if a moving image stream displayed in the first region is continuously used in the second region while the second region is smaller in width and height than the first region, and a function for calculating the number (n) of frames where the data communication amount becomes small if the moving image stream is continuously used on the basis that the moving image stream is set to be continuously used if the combination has been found out. Furthermore, the information processing device 1 may be caused to include a function for creating a moving image stream suitable to the size of the second region and changing a setting so as to perform data transmission in the moving image stream when the number of transmission frames transmitted in the continuously used moving image stream has been counted and the number of transmission frames has exceeded "n".

Accordingly, it is possible to suppress the increase of the amount of information to be transferred.

In addition, the above-mentioned individual functions will be described in detail in a third embodiment described later.

In addition, the information processing device 1 may be caused to include a function for searching a combination where a data communication amount is supposed to become small if a moving image stream is also continuously used in a combination where the second region is greater in width or height than the first region, and a function for continuously using the moving image stream if the combination has been determined. Furthermore, the information processing device 1 may be caused to include a function for newly creating a moving image stream and performing data transmission in the moving image stream with respect to a region in the second region, which is difficult for only the first region to cover, and a function for creating a moving image stream suitable to the size of the second region and changing a setting so as to perform data transmission in the moving image stream when a time period during which data is transmitted in a continuously used stream has exceeded a predetermined period of time.

Accordingly, it is possible to suppress the increase of the amount of information to be transferred.

In addition, the above-mentioned individual functions will be described in detail in a fourth embodiment described later.

In addition, the identification unit 1b, the determination unit 1c, the transmission unit 1d, and the update-frequency judgment unit 1f may be realized using a function provided in a central processing unit (CPU) included in the information processing device 1. In addition, the storage unit 1a and the image storage unit 1e may be realized using a data storage region provided in a random access memory (RAM), a hard disk drive (HDD), or the like, included in the information processing device 1.

In addition, when the transmission unit 1d transmits image data to the client device 2, the transmission of the image data may also be applied to a case in which large-capacity data such as images or moving images is handled using a remote desktop protocol (RDP), a remote frame buffer (RFB) protocol used in virtual network computing (VNC), or the like, for example.

Hereinafter, the embodiment will be described more specifically.

Second Embodiment

Figure 2:
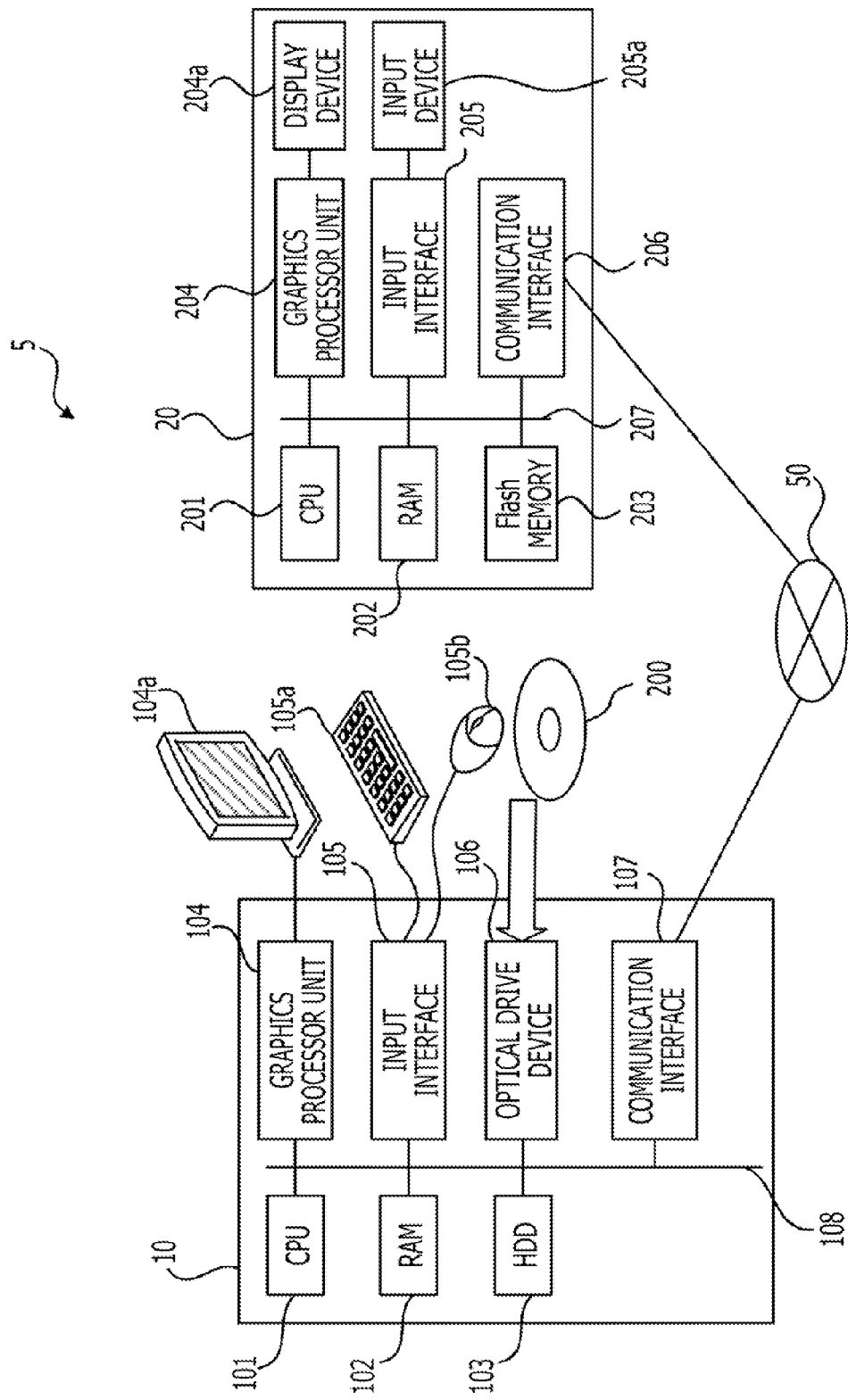
FIG. 2 is a diagram illustrating an information processing system of a second embodiment.

FIG. 2 is a diagram illustrating the information processing system of a second embodiment.

As illustrated in FIG. 2, an information processing system 5 includes a server device 10 and a client device 20.

These server device 10 and client device 20 are connected to each other through a predetermined network (Network) 50 so that the server device 10 and client device 20 can communicate with each other. As such a network 50, regardless of wired or wireless connections, arbitrary types of communication networks such as Internet, a local area network (LAN), a virtual private network (VPN), and the like may be adopted. In addition, as an example, a case may be assumed in which an RFB protocol in VNC is adopted as a communication protocol (Protocol) between the server device 10 and the client device 20.

In addition, while, in FIG. 2, a case is illustrated in which one client device is connected to one server device 10, more than one client device may be connected to one server device 10.

The server device 10 is a computer (Computer) providing a service for remotely controlling a screen displayed in the client device 20.

The client device 20 is a computer located on a side receiving the remote screen control service provided by the server device 10. As examples of such a client device 20, mobile terminals such as a mobile phone, a personal handyphone system (PHS), a personal digital assistant (PDA), and the like may also be applied in addition to fixed terminals such as a personal computer and the like.

Hereinafter, the hardware configurations of the server device 10 and the client device 20 will be described. The whole device of the server device 10 is controlled by a CPU 101. A RAM 102 and a plurality of peripheral devices are connected to the CPU 101 through a bus 108.

The RAM 102 is used as the main storage device of the server device 10. At least portions of the program of an operating system (OS) and an application program which are to be executed by the CPU 101 are temporarily stored in the RAM 102. In addition, various kinds of data to be used in processing performed by the CPU 101 are stored in the RAM 102.

Peripheral devices connected to the bus 108 include a hard disk drive 103, a graphics processor unit 104, an input interface 105, an optical drive device 106, and a communication interface 107.

The hard disk drive 103 magnetically performs writing and reading of data for an internal disk. The hard disk drive 103 is used as the secondary storage device of the server device 10. The program of the OS, the application program, and the various kinds of data are stored in the hard disk drive 103. In addition, as the secondary storage device, a semiconductor storage device such as a flash memory or the like may also be used.

A monitor 104a is connected to the graphics processor unit 104. In accordance with an instruction from the CPU 101, the graphics processor unit 104 causes an image to be displayed on the screen of the monitor 104a. As the monitor 104a, a liquid crystal display device utilizing a cathode ray tube (CRT), or the like, may be cited.

A keyboard 105a and a mouse 105b are connected to the input interface 105. The input interface 105 transmits, to the CPU 101, signals sent from the keyboard 105a and the mouse 105b. In addition, the mouse 105b is an example of a pointing device, and another pointing device may also be used. As examples of the other pointing device, a touch panel, a tablet, a touch-pad, a trackball, and the like may be cited.

The optical drive device 106 reads out data recorded in the optical disk 200 using laser light or the like. The optical disk 200 is a portable recording medium in which data is recorded so as to be readable on the basis of the reflection of light. As examples of the optical disk 200, a Blu-Ray (registered trademark), a digital versatile disc (DVD), a DVD-RAM, a compact disc read only memory (CD-ROM), a CD-R (Recordable)/RW (ReWritable), and the like may be cited.

The communication interface 107 is connected to the network 50. The communication interface 107 transmits and receives data to and from the client device 20 through the network 50.

The whole device of the client device 20 is controlled by the CPU 201. A RAM 202, a flash memory 203, a graphics processor unit 204, an input interface 205, and a communication interface 206 are connected to the CPU 201 through the bus 207.

The functions of the RAM 202, the graphics processor unit 204, the input interface 205, and the communication interface 206 are substantially the same as those of the RAM 102, the graphics processor unit 104, the input interface 105, and the communication interface 107, respectively.

In addition, the client device 20 is equipped with no hard disk drive 103, and includes the flash memory 203.

A display device 204a is a device displaying various kinds of information, for example, a desktop screen transmitted from the server device 10, and the like, and as an example, a monitor, a display, a touch panel, or the like may be cited. In FIG. 2, a mobile terminal-type client device 20 is exemplified, and the display device 204a is installed in the client device 20.

An input device 205a is a device accepting the instruction input of a user, and as an example, a keyboard, a mouse, or the like may be cited. In addition, in cooperation with the mouse, the display device 204a also realizes a pointing device function.

According to such a hardware configuration as described above, it is possible to realize the processing function of the present embodiment.

Figure 3:
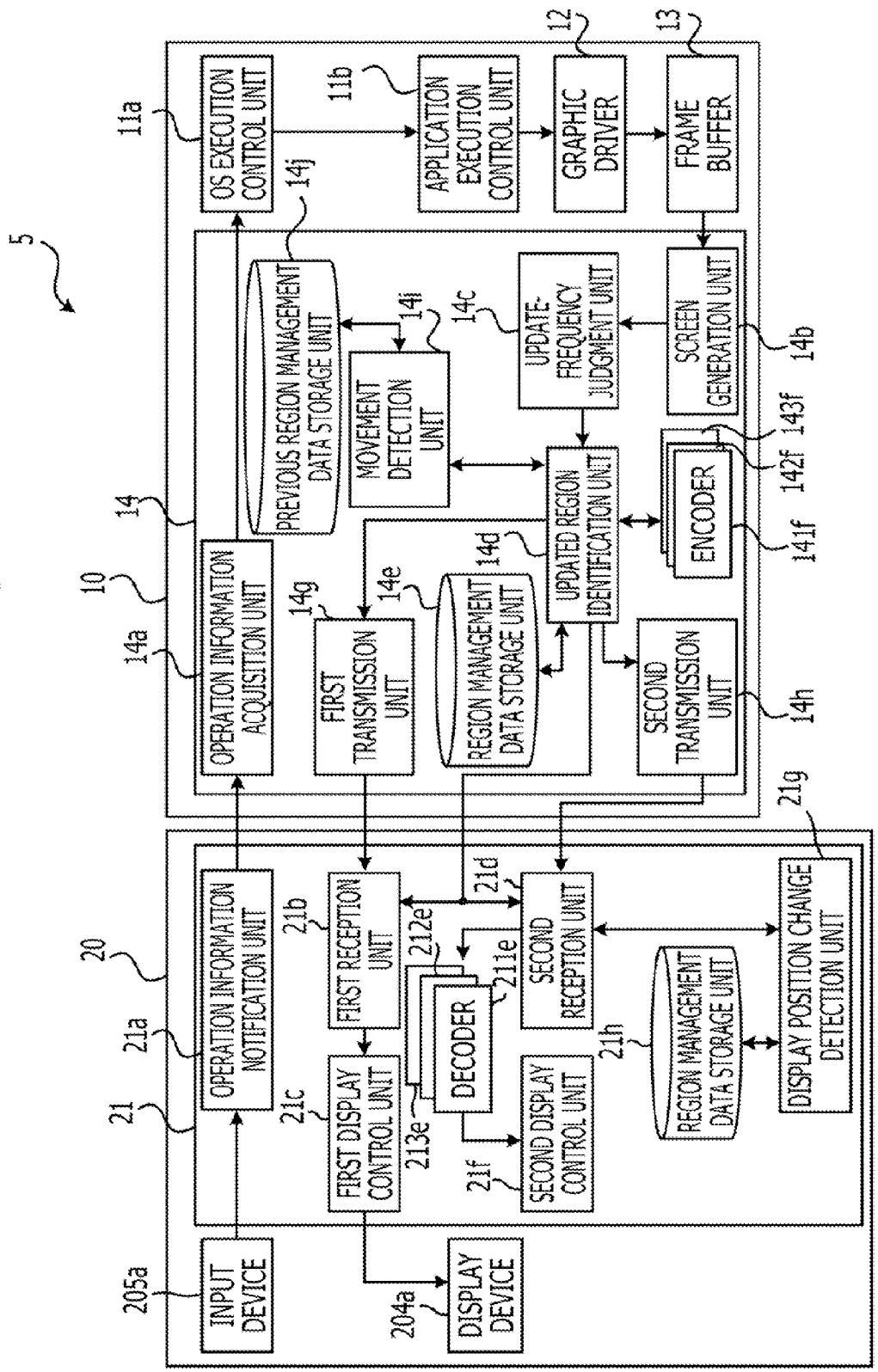
FIG. 3 is a block diagram illustrating functions of a server device and a client device of the second embodiment.

FIG. 3 is a block diagram illustrating the functions of the server device and the client device of the second embodiment.

An application for a server, used for remote screen control, is installed or preinstalled in the server device 10. In addition, hereinafter, the application for a server, used for remote screen control, is referred to as a "server-side application used for remote screen control".

As a basic function, this server-side application used for remote screen control includes a function for providing a remote screen control service. As an example, after having acquired operation information in the client device 20, the server-side application used for remote screen control causes an application operating in the self-device to execute processing requested by the operation. In addition, after having generated a screen in which the result of processing executed by the application is to be displayed, the server-side application used for remote screen control transmits the screen to the client device 20 through the network 50. At this time, the server-side application used for remote screen control transmits a region, namely, the image of an updated rectangle, the region being a region into which pixels in a portion where a change has occurred with respect to a bitmap image displayed in the client device 20 before the current screen generation aggregate. In addition, while, hereinafter, as an example, a case will be described in which the image in the updated portion is formed by the image of a rectangle, the disclosed device may also be applied to a case in which the image in the updated portion is formed by a shape other than the rectangle.

In addition to this, the server-side application used for remote screen control also includes a function for compressing data in a portion in which a motion between frames is large into data based on a compression method for a moving image and transmitting the data to the client device 20. As an example, the server-side application used for remote screen control segments a screen, generated from the result of processing executed by the application, into a plurality of regions and monitors the frequency of update with respect to each segmented region. At this time, the server-side application used for remote screen control transmits, to the client device 20, the region identification position data of a region in which the frequency of update has exceeded a threshold value, namely, a frequently updated region. In parallel with this, after having encoded a bitmapped image in the frequently updated region into data based on an MPEG method such as MPEG-2, MPEG-4, or the like, the server-side application used for remote screen control transmits the data to the client device 20. In addition, while, here, a case has been exemplified in which the image is compressed into the data based on the MPEG method, the embodiment is not limited to this example. For example, an arbitrary compress coding method may be adopted that is a compression method for a moving image, for example, Motion-JPEG (joint photographic experts group) or the like.

An application for a client, used for remote screen control, is installed or preinstalled in the client device 20. In addition, hereinafter, the application for a client, used for remote screen control, is referred to as a "client-side application used for remote screen control".

This client-side application used for remote screen control includes a function for notifying the server device 10 of operation information accepted through the input device 205a. As an example, as the operation information, the client-side application used for remote screen control gives notice of a double click, drag, the displacement amount of a mouse cursor, obtained through the displacement operation of the mouse, and the like, in addition to the right-and-left clicks of the mouse. As the other examples, the client-side application used for remote screen control also gives notice of the rotation amount of a mouse wheel, the type of a key held down in a keyboard, and the like, as the operation information.

Furthermore, the client-side application used for remote screen control includes a function for causing a display device included in the client device 20 to display an image received from the server device 10. As an example, when having received the bitmapped image of the updated rectangle from the server device 10, the client-side application used for remote screen control displays the image of the updated rectangle with aligning the image of the updated rectangle with a position at which a change from a previous bitmapped image has occurred.

As another example, when having received the region identification position data of the frequently updated region from the server device 10, the client-side application used for remote screen control defines a region on a display screen, which corresponds to a position included in the region identification position data, as a blank region that is not included in the display target of the bitmapped image. On that basis, when having received data based on the compression method for a moving image, the client-side application used for remote screen control causes the data to be displayed in the blank region after decoding the data.

Hereinafter, individual functions included in the server device 10 and the client device 20 will be described in detail.

The server device 10 includes an OS execution control unit 11*a*, an application execution control unit 11*b*, a graphic driver 12, a frame buffer 13, and a remote screen control unit 14. In addition, in the example illustrated in FIG. 3, it is assumed that, in addition to the functional units illustrated in FIG. 3, the server device 10 also includes various kinds of functional units included in a known computer, for example, the functions of various kinds of input devices, display devices, and the like.

The OS execution control unit 11*a* controls the execution of OS. For example, the OS execution control unit 11*a* detects an instruction for activating an application or a command for an application, from the operation information acquired by an operation information acquisition unit 14*a* described later. For example, when having detected double click on an icon of the application, the OS execution control unit 11*a* instructs the application execution control unit 11*b* to activate an application corresponding to that icon. As another example, when having detected an operation requesting the execution of a command on the operation screen of a running application, namely, on a so-called window, the OS execution control unit 11*a* instructs the application execution control unit 11*b* to execute the command.

The application execution control unit 11*b* controls the execution of the application on the basis of the instruction of the OS execution control unit 11*a*. For example, when being instructed to activate an application by the OS execution control unit 11*a* or when a running application is instructed to execute a command, the application execution control unit 11*b* causes an application to operate. In addition, the application execution control unit 11*b* requests the graphic driver 12 to draw, in the frame buffer 13, the display-use image of a processing result obtained by executing the application. When, in such a way, requesting the graphic driver 12 to draw, the application execution control unit 11*b* notifies the graphic driver 12 of the display-use image and the drawing position of the display-use image. In addition, an application executed by the application execution control unit 11*b* may also be a preinstalled application or an application installed after the shipment of the server device 10. In addition, the application may also be an application operating in a network environment such as JAVA (registered trademark) or the like.

The graphic driver 12 executes drawing processing for the frame buffer 13. For example, when having accepted a drawing request from the application execution control unit 11*b*, the graphic driver 12 draws the display-use image of the processing result of an application at a drawing position on the frame buffer 13 specified by the application, in a bitmap format. In addition, while, here, a case has been described in which a drawing request is accepted on the basis of an application, a drawing request from the OS execution control unit 11*a* may also be accepted. As an example, when having accepted a drawing request for a mouse cursor from the OS execution control unit 11*a*, the graphic driver 12 draws the display-use image of the mouse cursor at a drawing position on the frame buffer 13, specified by OS, for example, in a bitmap format.

The frame buffer 13 stores therein the image data drawn by the graphic driver 12. As examples of one form of such a frame buffer 13, semiconductor memory devices such as RAMs including a video random access memory (VRAM), read only memories (ROM), flash memories, and the like may be cited. In addition, as the frame buffer 13, a storage device such a hard disk drive, an optical disk, or the like may also be adopted.

The remote screen control unit 14 provides the client device 20 with a remote screen control service through the server-side application used for remote screen control.

This remote screen control unit 14 includes an operation information acquisition unit 14*a*, a screen generation unit 14*b*, an update-frequency judgment unit 14*c*, an updated region identification unit 14*d*, a region management data storage unit 14*e*, encoders 141*f*, 142*f*, and 143*f*, a first transmission unit 14*g*, a second transmission unit 14*h*, a movement detection unit 14*i*, and a previous region management data storage unit 14*j*. In addition, while, in the present embodiment, a case will be exemplified in which three encoders 141*f*, 142*f*, and 143*f* are included, the number of encoders is not limited to three.

The operation information acquisition unit 14*a* acquires operation information from the client device 20. As examples of such operation information, a double click, drag, the displacement amount of a mouse cursor, obtained through the displacement operation of the mouse, and the like, in addition to the right-and-left clicks of the mouse, may be cited. As the other examples of the operation information, the rotation amount of a mouse wheel, the type of a key held down in a keyboard, and the like may also be cited.

The screen generation unit 14*b* generates the image data of a screen to be displayed in the display device 204*a* in the client device 20. As an example, every time the image data is stored in the frame buffer 13 by the graphic driver 12, the screen generation unit 14*b* activates the following processing. Namely, the screen generation unit 14*b* compares image data, which configures a desktop screen displayed in the client device 20 at the time of the generation of a previous frame, with image data written into the frame buffer 13 at the time of the generation of a current frame. In addition, after putting together pixels in portions in which change have occurred from the previous frame, the screen generation unit 14*b* generates the image of an updated rectangle shaped in the form of a rectangle.

The update-frequency judgment unit 14*c* judges the frequency of update between frames with respect to each of regions into which the image of image data stored in the frame buffer 13 is segmented. As an example, the update-frequency judgment unit 14*c* stores the updated rectangle generated by the screen generation unit 14*b* in a working internal memory not illustrated, over a predetermined time period.

At this time, the update-frequency judgment unit 14*c* stores therein attribute information capable of identifying the position and the size of the updated rectangle. For example, this attribute information includes information relating to the coordinates of the corner of the top left of the updated rectangle and the width and height of the updated rectangle. A time period for which such an updated rectangle is stored correlates with the degree of accuracy of setting a frequently updated region, and the erroneous detection of the frequently updated region is reduced with an increase in the time period. In addition, here, as an example, a case is assumed in which the image of the updated rectangle is stored over one second. At this time, when a predetermined time period has elapsed after the storage of the image of the updated rectangle, the update-frequency judgment unit 14c judges the frequency of update of the desktop screen using a map obtained by segmenting, in the form of a mesh, a screen to be displayed by the display device 204a.

Figure 4:
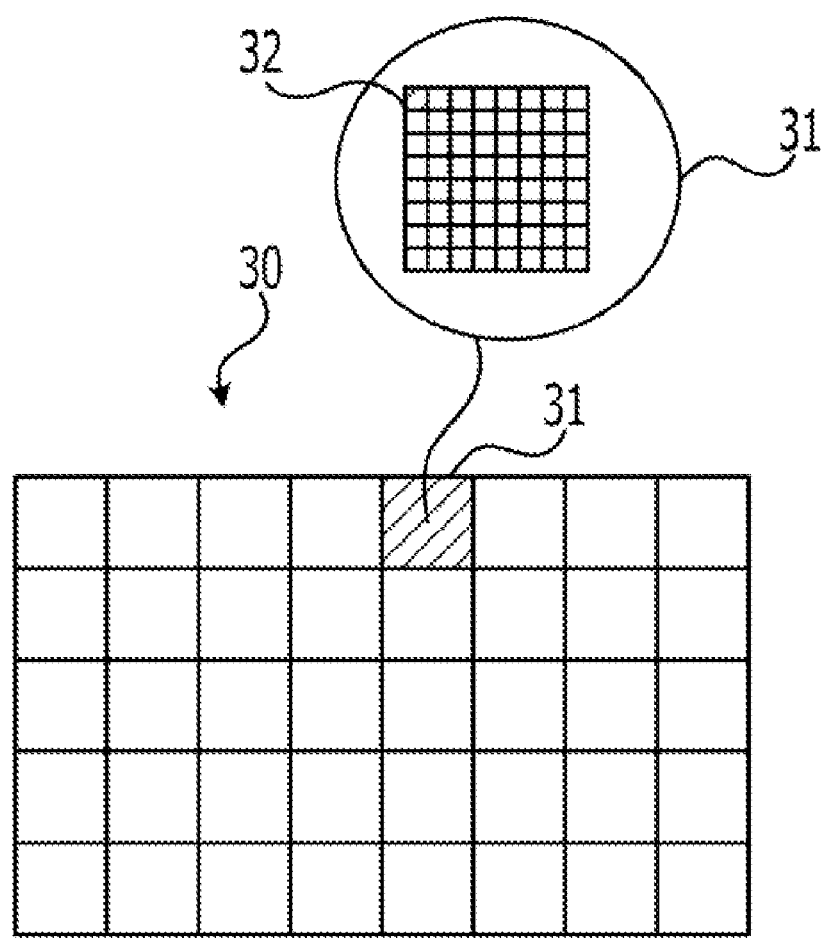
FIG. 4 is a diagram explaining a segmentation guideline of a screen to be displayed by a display device.

FIG. 4 is a diagram explaining the segmentation guideline of a screen to be displayed by the display device.

FIG. 4 illustrates a map 30 used for judging the frequency of update. In FIG. 4, a portion surrounded by a circle indicates the detail of the mesh 31. In FIG. 4, a case is assumed in which the update-frequency judgment unit 14c performs segmentation on the basis that a block of 8 pixels×8 pixels from among pixels occupying the map 30 is one mesh 31. Therefore, one mesh 31 includes 64 pixels 32.

Here, the update-frequency judgment unit 14c sequentially deploys the image of the updated rectangle in the map used for judging the frequency of update, in accordance with the position and size of the updated rectangle, stored in the working internal memory. In addition, every time the updated rectangle is deployed in the map, the update-frequency judgment unit 14c accumulates and adds the update count of the mesh of a portion overlapping with the updated rectangle on the map. At this time, when the updated rectangle deployed on the map overlaps with pixels included in the mesh and the number of the overlapped pixels extends to a predetermined number, the update-frequency judgment unit 14c adds one to the update count of the mesh. In addition, here, a case is assumed in which the update count of the mesh is subjected to addition when the updated rectangle overlaps with at least one pixel included in the mesh, and the case will be described.

Figure 5A:
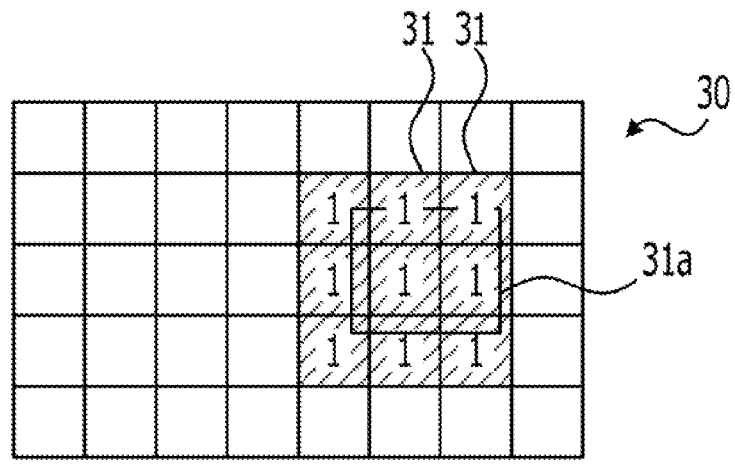
FIG. 5A to FIG. 5C are diagrams explaining a judgment guideline of the frequency of update of the screen to be displayed by the display device.
Figure 5B:
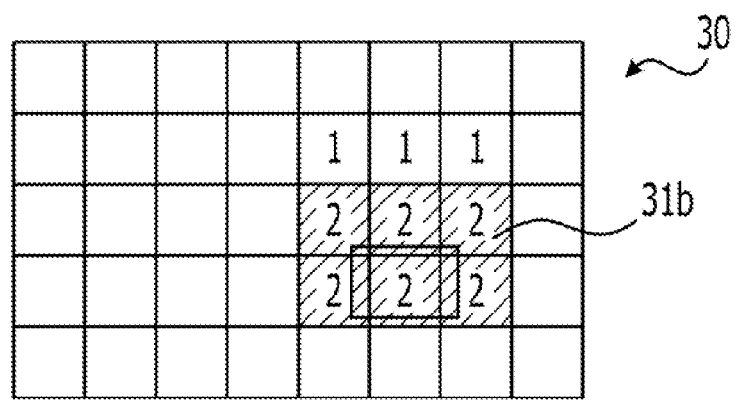
Figure 5C:
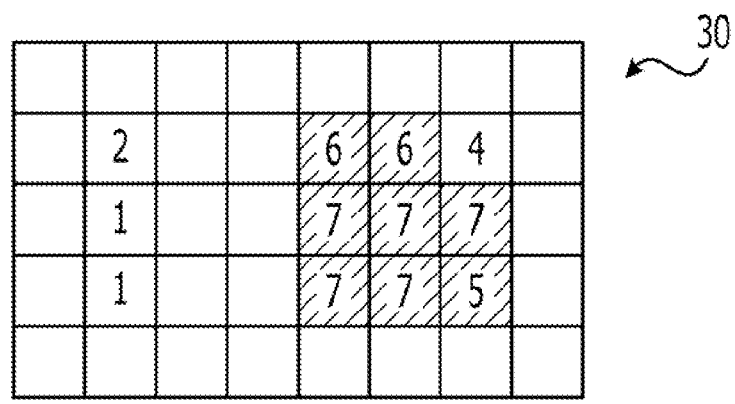

FIG. 5A to FIG. 5C are diagrams explaining the judgment guideline of the frequency of update of the screen to be displayed by the display device.

Here, numbers individually illustrated in nine meshes 31, 31, . . . in the map 30 used for judging the frequency of update, illustrated in FIG. 5A, indicate the update counts of the meshes 31 at the time of the deployment of the updated rectangle 31a. In addition, numbers illustrated in meshes 31 in the map 30 in FIG. 5B indicate the update counts of the meshes 31 at the time of the deployment of the updated rectangle 31b. Furthermore, numbers illustrated in meshes 31 in the map 30 in FIG. 5C indicate the update counts of the meshes 31 at a time when all updated rectangles stored in the working internal memory are deployed. In addition, it is assumed that, in FIG. 5A to FIG. 5C, the update counts of the meshes 31 in which no number is illustrated are zero.

As illustrated in FIG. 5A, when the updated rectangle 31a is deployed in the map 30, the meshes 31 in a shaded portion overlap with the updated rectangle 31a. Therefore, the update-frequency judgment unit 14c adds one to each of the update counts of the meshes 31 in the shaded portion. In this case, since the update count of each of the meshes 31 is zero, each of the update counts in the shaded portion is subjected to addition to increase from zero to one.

Furthermore, as illustrated in FIG. 5B, when the updated rectangle 31b is deployed in the map 30, the meshes 31 in a shaded portion overlap with the updated rectangle 31b. Therefore, the update-frequency judgment unit 14c adds one to each of the update counts of the meshes 31 in the shaded portion. In this case, since the update count of each of the meshes 31 is one, each of the update counts in the shaded portion is subjected to addition to increase from one to two.

FIG. 5C illustrates an example of the map 30 where all updated rectangles are deployed in the map.

In addition, when having finished deploying all updated rectangles stored in the working internal memory in the map 30, the update-frequency judgment unit 14c acquires the mesh 31 whose update count for a predetermined time period, namely, the frequency of update, exceeds a threshold value. In regard to the example in FIG. 5C, when the threshold value is set to "4", the meshes 31 in the shaded portion turn out to be acquired. With respect to such a threshold value, with the value thereof being set to a higher value, it is possible to extract a portion frequently updated on the desktop screen, and it is possible to encode this portion using the encoders 141f to 143f. In addition, in regard to the above-mentioned "threshold value", a user may be caused to select a value set by a developer of the server-side application used for remote screen control, in a step-by-step manner, or an end-user may directly set the above-mentioned "threshold value".

Returning to FIG. 3, FIG. 3 will be described again.

The updated region identification unit 14d sets, to a frequently updated region, a region frequently updated from among the desktop screen displayed in the client device 20.

When the update-frequency judgment unit 14c acquires the mesh whose update count exceeds the threshold value, the updated region identification unit 14d corrects a mesh-connected body, in which adjacent meshes are connected to one another, into a rectangle. For example, after deriving an interpolation region to be interpolated into the mesh-connected body, the updated region identification unit 14d corrects the mesh-connected body into the rectangle by adding the interpolation region to the mesh-connected body. An algorithm for deriving a region where the connected body of meshes is corrected into the rectangle with minimal interpolation is applied to this derivation of the interpolation region.

Figure 6:
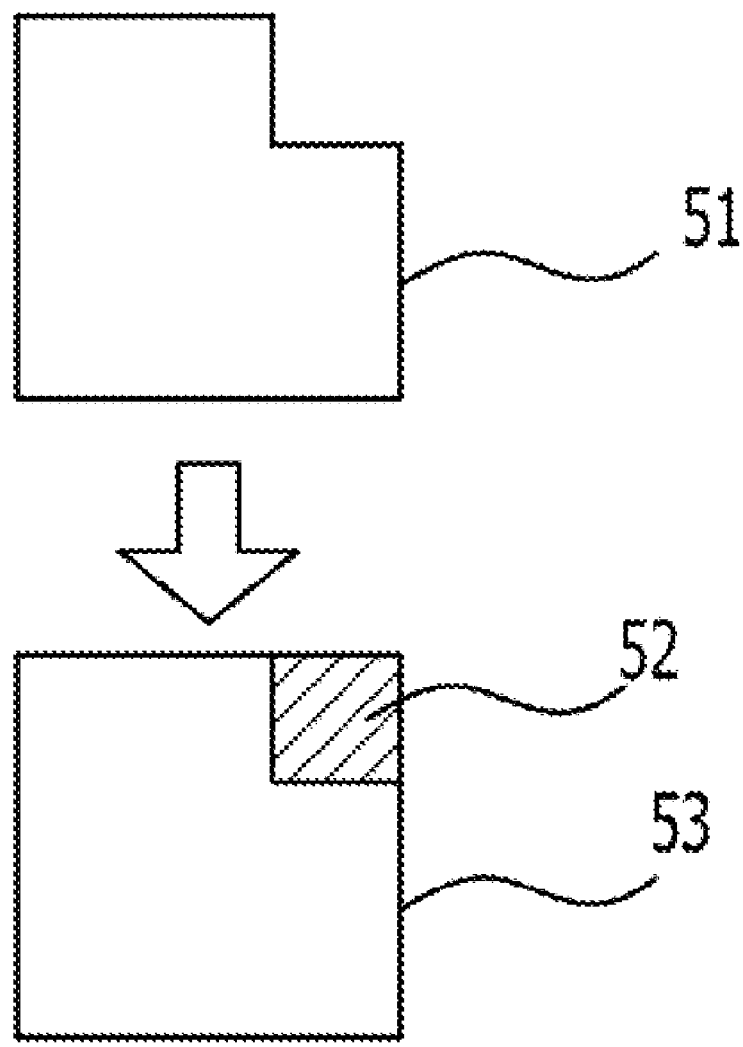
FIG. 6 is a diagram explaining a correction guideline of a mesh-connected body.

FIG. 6 is a diagram explaining the correction guideline of the mesh-connected body.

As illustrated in FIG. 6, the updated region identification unit 14d corrects the mesh-connected body 51 to the rectangle 53 by adding the interpolation region 52 to the mesh-connected body 51 before the correction. Since the synthesis of a rectangle described later is not completed in this stage, and the rectangle 53 has not been confirmed to be the frequently updated region yet, it is assumed that the rectangle 53 after the correction is referred to as the "candidate of the frequently updated region".

When a plurality of candidates of the frequently updated region exist, the updated region identification unit 14d synthesizes a rectangle including candidates of the frequently updated region where distances between a plurality of candidates of the frequently updated region are less than or equal to a predetermined value. In this case, it is assumed that a distance between candidates of the frequently updated region indicates the shortest distance of a rectangle after the correction. As an example, the updated region identification unit 14d synthesizes the rectangle including candidates of the frequently updated region, by adding the interpolation region to the candidates of the frequently updated region on the basis that the interpolation region filling a gap between individual candidates is derived when candidates of the frequently updated region are combined. An algorithm for deriving a region where a gap between the candidates of the frequently updated region is corrected into a combined body with minimal interpolation is applied to this derivation of the interpolation region.

Figure 7:
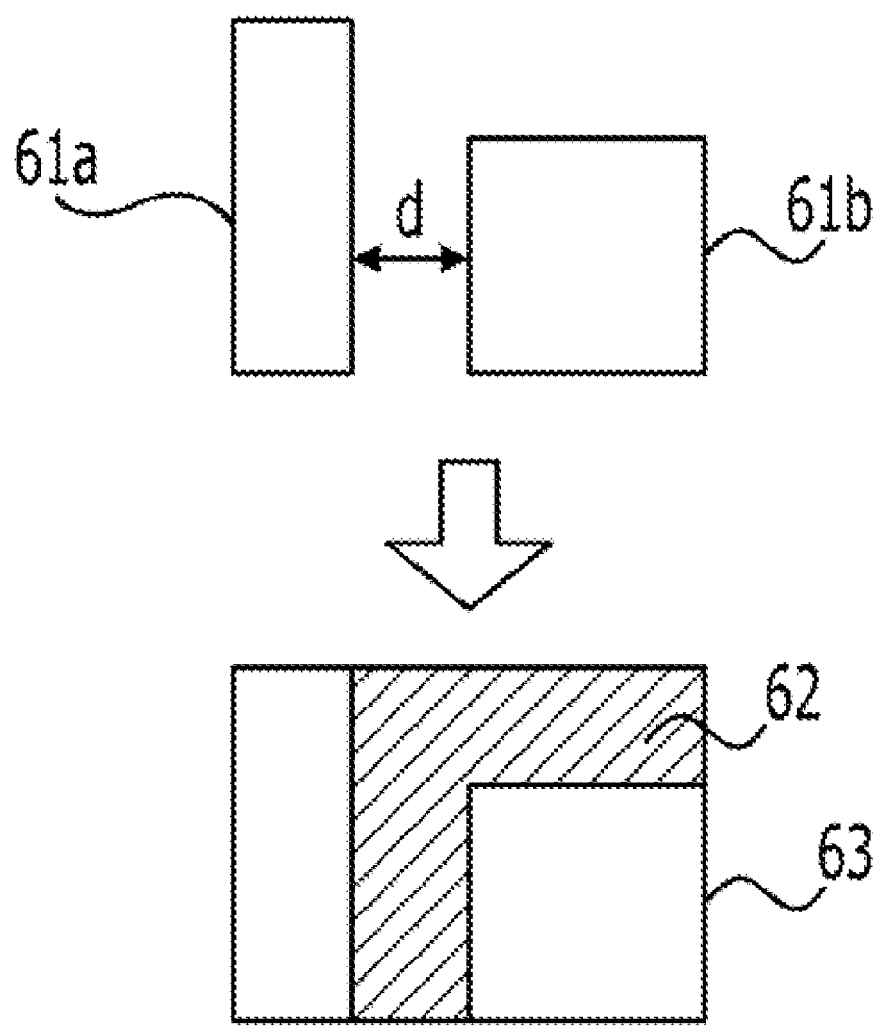
FIG. 7 is a diagram explaining a combination guideline of a candidate of a frequently updated region.

FIG. 7 is a diagram explaining the combination guideline of a candidate of the frequently updated region.

As illustrated in FIG. 7, the updated region identification unit 14d creates a combined body 63 including a candidate 61a of the frequently updated region and a candidate 61b of the frequently updated region, by adding an interpolation region 62 to the candidate 61a of the frequently updated region and the candidate 61b of the frequently updated region. In addition, the updated region identification unit 14d sets the combined body 63 obtained in this way to the frequently updated region.

When having set the frequently updated region in this way, the updated region identification unit 14d transmits, to the client device 20, region position identification data including information for identifying the position and size of the identified frequently updated region and an ID (region ID) used for identifying the frequently updated region. Accordingly, a portion corresponding to the frequently updated region from among the bitmap data of the desktop screen displayed in the client device 20 is subjected to blank display. After that, the updated region identification unit 14d clears the update count of the mesh mapped to the working internal memory. In addition, the updated region identification unit 14d stores region management data in the region management data storage unit 14e, the region management data being obtained by adding, to the region position identification data, IDs used for identifying the encoders (moving-image codecs) 141f, 142f, and 143f that encode an image to be displayed at a position identified by the region position identification data. In addition, the region management data storage unit 14e may be realized using a cache memory or the like in a CPU.

Figure 8A:
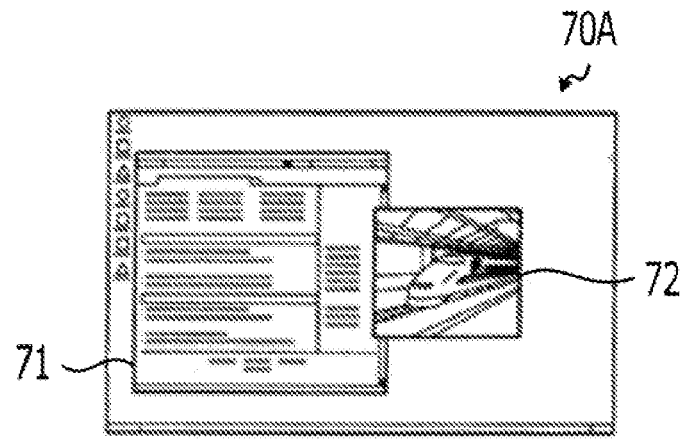
FIG. 8A to FIG. 8C are diagrams explaining region position identification data.
Figure 8B:
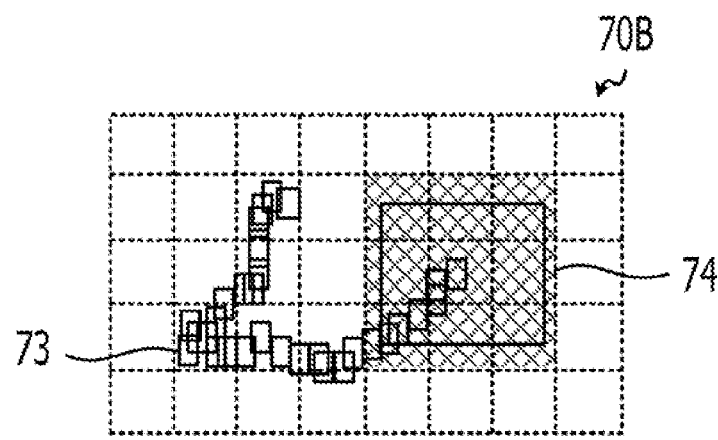
Figure 8C:
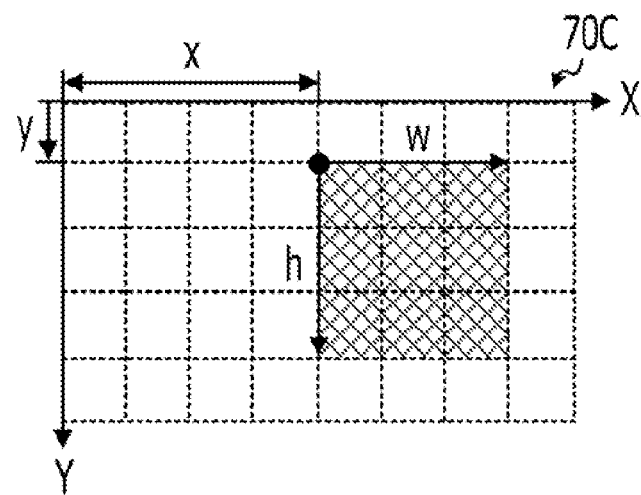

FIG. 8A to FIG. 8C are diagrams explaining the region position identification data.

As illustrated in FIG. 8A, a desktop screen 70A drawn in the frame buffer 13 includes a browser screen 71 and a moving-image reproduction screen 72. When a change over time from the desktop screen 70A is tracked, the updated rectangle of the browser screen 71 that is a still image is not detected, as illustrated in a screen 70B in FIG. 8B, and an updated rectangle relating to the displacement trajectory 73 of a mouse and a moving-image reproduction region 74 based on an application are detected.

It is assumed that, of these, meshes whose update counts exceed a threshold value in the moving-image reproduction region 74, namely, a shaded portion illustrated in the drawing is identified by the updated region identification unit 14d. In this case, the updated region identification unit 14d creates the region management data obtained by adding the IDs used for identifying the encoders to the region position identification data including the coordinates (x, y) of the corner of the top left of the frequently updated region of a shaded portion illustrated in a screen 70C in FIG. 8C and the width w and height h of the frequently updated region. In addition, the updated region identification unit 14d stores the created region management data in the region management data storage unit 14e.

Furthermore, the updated region identification unit 14d sends the created region management data to the movement detection unit 14i.

In addition, the updated region identification unit 14d transmits the region management data to the client device 20 as necessary. In addition, while, here, a case has been described in which the coordinates of the corner of the top left are adopted as a point for identifying the position of the frequently updated region, another corner may be adopted.

In addition, an arbitrary point other than the corner, for example, the center of gravity or the like, may be adopted that can identify the position of the frequently updated region. In addition, while, here, a case has been described in which the top left of the screen is regarded as the original point of the coordinate axes XY, an arbitrary point within the screen or outside the screen may be regarded as the original point.

Figure 9:
FIG. 9 is a diagram explaining the content of region position identification data stored in a region management data storage unit.

FIG. 9 is a diagram explaining the content of the region management data stored in the region management data storage unit.

In the present embodiment, information is stored in the region management data storage unit 14e in table form. The fields of a region ID, x, y, w, h, and an encoder are provided in a region management table 141. Pieces of information arranged in a horizontal direction are associated with one another.

An ID for identifying a region is stored in the field of the region ID.

The x coordinate of the corner of the top left of the frequently updated region is stored in the field of x.

The y coordinate of the corner of the top left of the frequently updated region is stored in the field of y.

The value (unit: pixel) of the width of the frequently updated region is stored in the field of w.

The value (unit: pixel) of the height of the frequently updated region is stored in the field of h.

An ID used for identifying an encoder encoding an image to be displayed in the frequently updated region identified by the pieces of information stored in the fields of x, y, w, and h is stored in the field of the encoder.

Incidentally, every time the screen generation unit 14b generates an updated rectangle, the updated region identification unit 14d determines whether the updated rectangle is included in the frequently updated region stored in the working internal memory, namely, a region that is being transmitted as a moving image by the second transmission unit 14h. At this time, when the updated rectangle is not included in the frequently updated region, the updated region identification unit 14d causes the first transmission unit 14g to transmit the image of the updated rectangle and the region management data. On the other hand, when the updated rectangle is included in the frequently updated region, the updated region identification unit 14d does not cause the first transmission unit 14g to transmit the image of the updated rectangle and the region management data, as a general rule. In addition, when the updated rectangle is that of a mouse, drawn by the OS execution control unit 11a, the updated region identification unit 14d may cause the image of the updated rectangle relating to the mouse and the region management data to be transmitted, on an exceptional basis.

In addition, every time the bitmap data is drawn in the frame buffer 13, the updated region identification unit 14d determines whether or not the region management data of the frequently updated region has been registered in the region management data storage unit 14e. In addition, when the region management data of the frequently updated region has been registered, the updated region identification unit 14d clips the bitmapped image of a portion corresponding to the frequently updated region from among the bitmap data drawn in the frame buffer 13. In addition, the updated region identification unit 14d outputs the clipped bitmapped image to one of the encoders 141f, 142f, and 143f.

The encoders 141f, 142f, and 143f encode the bitmapped images of the frequently updated region, individually input from the updated region identification unit 14d. For example, the encoders 141f, 142f, and 143f encode the bitmapped images of the frequently updated region at a stage where the bitmapped images of the frequently updated region individually input from the updated region identification unit 14d reach the number of frames capable of forming a stream. In addition, as one form of an encoding method, an MPEG method such as MPEG-2, MPEG-4, or the like or a Motion-JPEG method may be cited.

The first transmission unit 14g transmits, to the client device 20, the image of the updated rectangle generated by the screen generation unit 14b and the region management data. As an example of a communication protocol used when the updated rectangle is transmitted, an RFB protocol in VNC is adopted.

The second transmission unit 14h transmits, to the client device 20, the encoded image group (hereinafter, referred to as a "moving image stream") of the frequently updated region encoded by the encoders 141f, 142f, and 143f, along with the region management data. As an example of a communication protocol used when the moving image stream is transmitted, a realtime transport protocol (RTP) may be adopted.

The movement detection unit 14i temporarily stores the region management data received from the updated region identification unit 14d in the previous region management data storage unit 14j. Hereinafter, the region management data temporarily stored in the movement detection unit 14i is referred to as "previous region management data". After that, when having received the region management data from the updated region identification unit 14d, the movement detection unit 14i compares the previous region management data stored in the previous region management data storage unit 14j with the region management data currently received. In addition, the movement detection unit 14i determines whether a moving image stream currently displayed in the display device 204a in the client device 20 is to be continuously used or a moving image stream is to be independently generated, for the frequently updated region identified by the currently received region management data. In addition, the movement detection unit 14i detects a combination where the communication of data can be effectively performed if processing is performed in which the currently displayed moving image stream is moved to the frequently updated region identified by the current region position identification data. In addition, when the combination is detected, the movement detection unit 14i adds information for causing the currently displayed moving image stream to be continuously used to the previous region management data stored in the previous region management data storage unit 14j.

FIG. 10 is a diagram explaining the content of the previous region management data stored in the previous region management data storage unit.

In the present embodiment, information is stored in the previous region management data storage unit 14j in table form. The fields of a region ID, x, y, w, h, an encoder, a continuous-use-destination region ID, nx, and ny are provided in the previous region management table 142. Pieces of information arranged in a horizontal direction are associated with one another.

An ID for identifying a region is stored in the field of the region ID.

The x coordinate of the corner of the top left of the frequently updated region is stored in the field of x.

The y coordinate of the corner of the top left of the frequently updated region is stored in the field of y.

The value of the width of the frequently updated region is stored in the field of w.

The value of the height of the frequently updated region is stored in the field of h.

An ID used for identifying an encoder encoding a moving image stream to be displayed in the frequently updated region identified by the pieces of information stored in the fields of x, y, w, and h is stored in the field of an encoder.

An ID for identifying a region where the encoder is caused to be continuously used is stored in the field of the continuous-use-destination region ID. When a frequently updated region newly set is not to continuously use the encoder, "no" is stored.

The x coordinate of the corner of the top left of the frequently updated region of a movement destination is stored in the field of nx.

The y coordinate of the corner of the top left of the frequently updated region of the movement destination is stored in the field of ny.

For example, data in the first line in FIG. 9 indicates that a region of 200 pixels in width and 200 pixels in height from the position of coordinates (0, 0) to which "1" is assigned as an ID for identifying a region has been registered as the frequently updated region and ID: 0x012fafa is assigned as information for identifying the encoder 141f. In addition, it is indicated that the encoder is determined to be continuously used by the frequently updated region having a region ID=1 from among the frequently updated regions newly set, and it is indicated that, at that time, a display position is changed to the position of (50, 50). While, in the same way, pieces of data in the second line and the third line also indicate that regions are set, the data in the second line indicates that the encoder is not to be continuously used in the frequently updated region newly set and it is necessary to discard the encoder.

Figure 11:
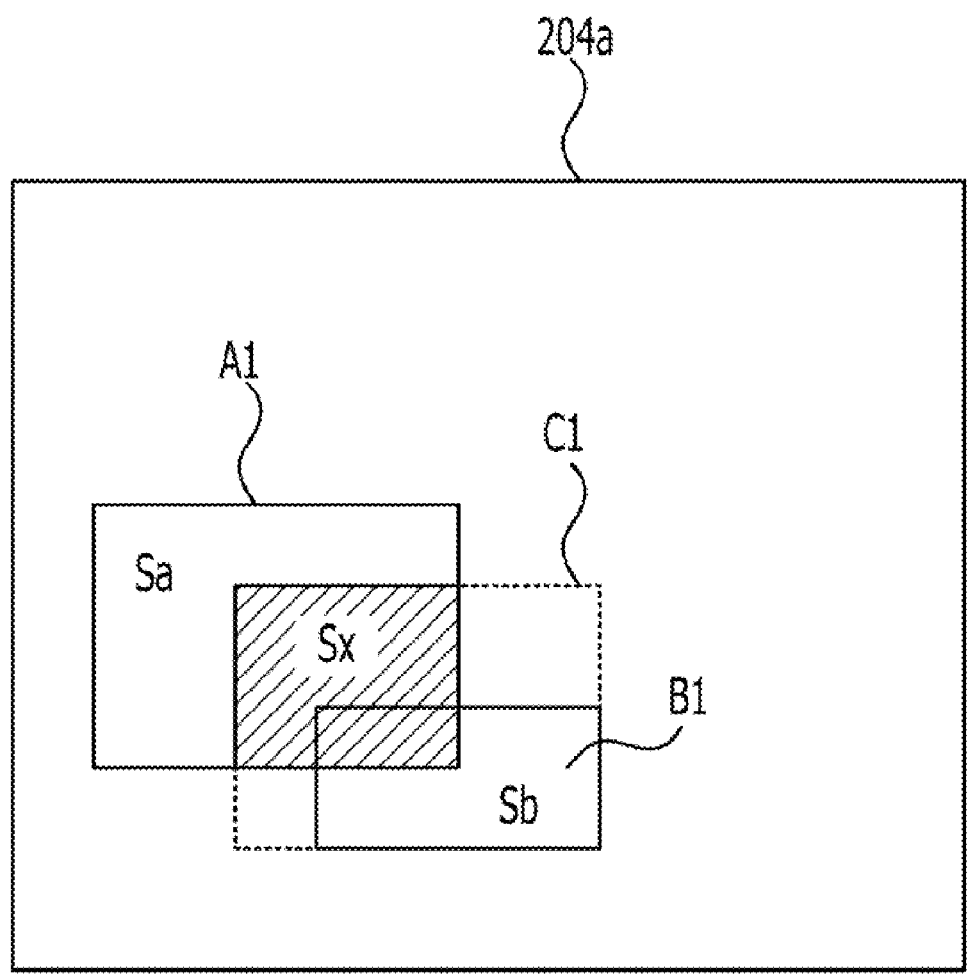
FIG. 11 is a diagram explaining an operation of a movement detection unit.

FIG. 11 is a diagram explaining the operation of the movement detection unit.

A region A1, a region B1, and a region C1 are illustrated in the display device 204a.

The region A1 is the frequently updated region identified by the previous region position identification data. The region B1 is a region identified by the region position identification data of the frequently updated region currently newly set. The region C1 is a region when a region in the region A1, which does not overlap with the region B1, is extracted and the region A1 is minimally moved so that the entire region B1 is included in the region A1. In addition, the region C1 is expressed by a dashed line.

Hereinafter, the frequently updated region identified by the previous region position identification data is referred to as a "previous frequently updated region", and the frequently updated region currently set is referred to as a "current frequently updated region". In addition, it is assumed that the display area of the region A1 is $S_a$, the display area of the region B1 is $S_b$, and the area of the overlapping region (a region indicated by a diagonal line) of the region A1 and the region C1 is $S_x$.

Here, when, independently from a moving image stream assigned to the region A1, a moving image stream to be displayed in the region B1 is created, a case may occur in which the amount of compressed data of the newly created moving image stream becomes greater than the amount of compressed data of the continuously used moving image stream. For example, when the area $S_x$ is large, a case may occur in which a data amount is reduced compared with the independent creation of the moving image stream, if the moving image stream assigned to the region A1 is assigned to the region B1.

Considering a relationship between the two, when, in place of independently generating the moving image stream, the moving image stream currently assigned to the previous frequently updated region is assigned to the current frequently updated region, the following two patterns may be considered where the probability that a data transmission amount is reduced is increased.

(Pattern 1) $S_a > S_b$ and the number of times encode is performed is greater than or equal to "1" in the following Expression (1)

(Pattern 2) $S_a = S_b$ and $S_x > 0$

In other words, the pattern 1 is a case in which the display area of the current moving image stream is less than the display area of the previous moving image stream and when a moving image stream assigned to the previous frequently updated region is encoded at least one time, the data amount thereof is smaller than a data amount at the time of the new creation of the moving image stream of the current frequently updated region.

In addition, the pattern 2 is a case in which the display area of the previous moving image stream is equal in size to the display area of the current moving image stream and an overlapping portion exists in the display position of the previous moving image stream and the display position of the current moving image stream.

Here, the number n of times encode is performed can be calculated from the following Expression (1).

$$n = (S_b + S_x - S_a) \times (E_I - E_P)/(S_a - S_b) \times E_P \quad (1)$$

Here, $E_I$ indicates the compression ratio (for example, 1/10) of the intra-frame compression of a moving image codec compressing the frequently updated region. $E_P$ indicates the compression ratio (an example: 1/100) of inter-frame compression.

Hereinafter, a method for creating Expression (1) will be described.

When the frequently updated region is continuously used, a data amount in a case in which encode is performed n times is expressed by the following Expression (2).

$$S_x \times E_P + (S_a - S_x) \times E_I + (n-1) \times S_a \times E_P \quad (2)$$

Here, $S_x \times E_P + (S_a - S_x) \times E_I$ indicates the data amount of the first frame, and $(n-1) \times S_a \times E_P$ indicates the data amount of the second frame and subsequent frames.

In addition, when the frequently updated region is not continuously used, a data amount in a case in which encode is performed n times is expressed by the following Expression (3).

$$S_b \times E_I + (n-1) \times S_b \times E_P \quad (3)$$

Here, $S_b \times E_I$ indicates the data amount of the first frame, and $(n-1) \times S_b \times E_P$ indicates the data amount of the second frame and subsequent frames.

Accordingly, since n where the data amounts of Expression (2) and Expression (3) are equal to each other becomes n in Expression (1), Expression (2) and Expression (3) are connected to each other using an equal sign, and these expressions are organized with respect to n, thereby obtaining Expression (1).

Here, n illustrated in Expression (1) is calculated as the number of frames where a data amount when the region B is dealt with as the movement of the region A and the screens of n frames are transmitted is equal to a data amount when the region B is not dealt with as the movement of the region A and the screens of n frames are transmitted.

Figure 12:
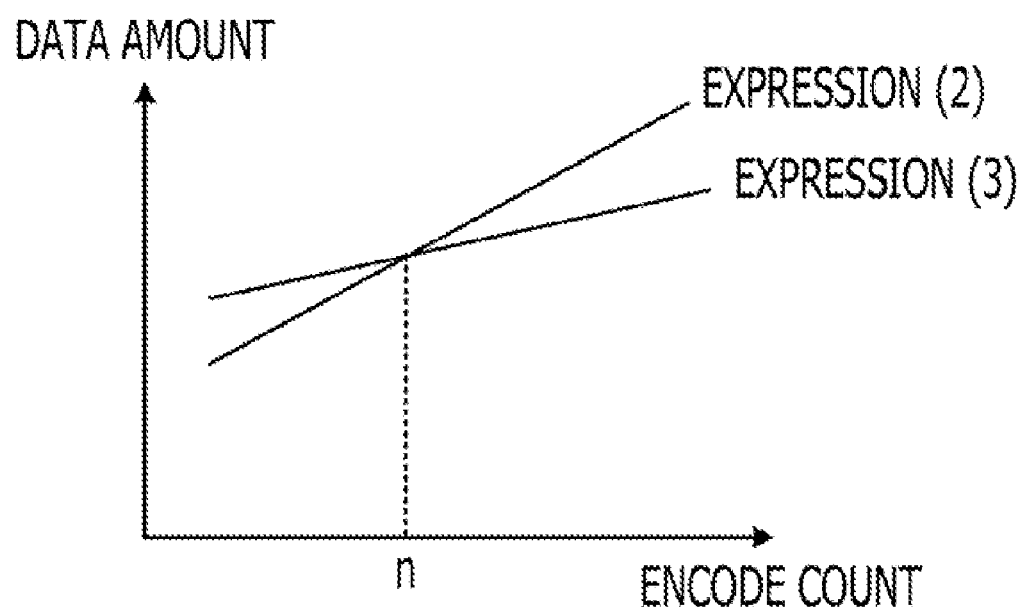
FIG. 12 is a diagram explaining a relationship between expressions.

FIG. 12 is a diagram explaining a relationship between Expression (2) and Expression (3).

Here, when the screens of frames whose number is less than or equal to the calculated n are transmitted, it is expected that a data amount becomes smaller if the region B is dealt with as the movement of the region A. For example, if the number n of times encode is performed is greater than or equal to "1" (For example, "2"), when encode is performed twice, the values of Expression (2) and Expression (3) become equal to each other. Namely, since, at the time when encode is performed at least one time, the data amount of Expression (2) becomes smaller than the data amount of Expression (3), it may be determined that a data amount is small if the currently assigned moving image stream is assigned to the current frequently updated region.

In addition, in the present embodiment, it is assumed that the compression ratio $E_I$ of the intra-frame compression and the compression ratio $E_P$ of the inter-frame compression are fixed and preliminarily held in the server device 20. However, for example, compression ratios calculated by actually compressing previous frames may also be used as these compression ratios.

In addition, while, in the present embodiment, by checking that n is greater than or equal to "1" in the pattern 1, it is determined whether or not the region A1 is to be continuously used, n may also be a value greater than "1". For example, by checking that n is greater than or equal to "5" in the pattern 1, it may also be determined whether or not the region A1 is to be continuously used. In this case, while the condition of continuous use becomes strict and a case may occur in which the region A1 is not continuously used, it is possible to reduce the probability that a data amount increases owing to the continuous use.

In addition, as the OS execution control unit 11a, the application execution control unit 11b, the graphic driver 12, the remote screen control unit 14, various kinds of integrated circuits or electronic circuits may be adopted. In addition, as part of a functional unit included in the remote screen control unit 14, another integrated circuit or another electronic circuit may also be adopted. For example, as examples of the integrated circuits, an application specific integrated circuit (ASIC), a field programmable gate array (FPGA), and the like may be cited. In addition, as examples of the electronic circuit, a CPU, a micro processing unit (MPU), and the like may be cited.

Returning to FIG. 3, the function of the client device will be described.

Function of Client Device

The client device 20 includes a remote screen control unit 21. In addition, in the example illustrated in FIG. 3, it is assumed that, in addition to the functional units illustrated in FIG. 3, the client device 20 also includes various kinds of functional units included in a known computer, for example, the functions of an audio output unit and the like.

The remote screen control unit 21 receives a remote screen control service provided by the server device 10 through the client-side application used for remote screen control. This remote screen control unit 21 includes an operation information notification unit 21a, a first reception unit 21b, a first display control unit 21c, a second reception unit 21d, decoders 211e, 212e, and 213e, a second display control unit 21f, a display position change detection unit 21g, and a region management data storage unit 21h.

The operation information notification unit 21a notifies the server device 10 of operation information based on the input device 205a. For example, as the operation information, the operation information notification unit 21a gives notice of a double click, drag, the displacement amount of a mouse cursor, obtained through the displacement operation of the mouse, and the like, in addition to the right-and-left clicks of the mouse. As the other examples, the operation information notification unit 21a also gives notice of the rotation amount of a mouse wheel, the type of a key held down in a keyboard, and the like, as the operation information.

The first reception unit 21b receives the image and the attribute information of the updated rectangle transmitted by the first transmission unit 14g in the server device 10. In addition, the first reception unit 21b also receives the region management data of the frequently updated region transmitted by the updated region identification unit 14d in the server device 10.

The first display control unit 21c causes the display device 204a to display the image of the updated rectangle, received by the first reception unit 21b. For example, the first display control unit 21c causes the bitmapped image of the updated rectangle to be displayed in a screen region in the display device 204a, which corresponds to a position and a size included in the region management data of the updated rectangle, received by the first reception unit 21b.

In addition, when the first reception unit 21b receives the region management data of the frequently updated region, the first display control unit 21c performs the following processing. Namely, the first display control unit 21c defines the screen region in the display device 204a, which corresponds to the position and the size of the frequently updated region, included in the region management data of the frequently updated region, as a blank region that is not included in the display target of the bitmapped image.

The second reception unit 21d receives the moving image stream of the frequently updated region, transmitted by the second transmission unit 14h in the server device 10, and the region management data transmitted along with the moving image stream.

The decoders 211e, 212e, and 213e decode the moving image streams of the frequently updated region, individually received by the second reception unit 21d. In addition, the decoders 211e, 212e, and 213e are equipped with decoders based on a decoding method complying with the encoding method installed on the server device 10. In addition, while, in the present embodiment, a case is exemplified in which the three decoders 211e, 212e, and 213e are included, the number of decoders is not limited to three.

On the basis of the region management data of the frequently updated region received by the first reception unit 21b, the second display control unit 21f causes the display device 204a to display the decoded image of the frequently updated region, decoded by one of the decoders 211e, 212e, and 213e. For example, the second display control unit 21f causes the decoded image of the frequently updated region to be displayed in the screen region in the display device 204a, which corresponds to the position and the size of the frequently updated region, included in the region management data of the frequently updated region.

When the second reception unit 21d has acquired the region management data along with the moving image stream, the display position change detection unit 21g determines whether or not a region ID matching a region ID included in the acquired region management data exists in region management data stored in the region management data storage unit 21h.

In addition, when the region ID does not exist, the display position change detection unit 21g stores the acquired region management data in the region management data storage unit 21h. In addition, when the region ID exists, the display position change detection unit 21g compares the region ID with the region management data stored in the region management data storage unit 21h, and detects image data where the position thereof is only different from the region ID while the size thereof is the same as the region ID. Accordingly, the display position change detection unit 21g detects the movement of the frequently updated region and changes position information within the region management data.

Figure 13:
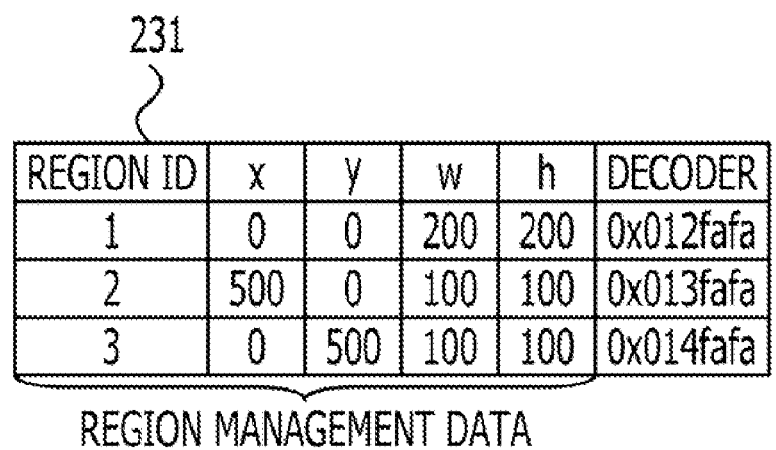
FIG. 13 is a diagram illustrating an example of region management data stored in the region management data storage unit included in the client device of the second embodiment.

FIG. 13 is a diagram illustrating an example of the region management data stored in the region management data storage unit included in the client device of the second embodiment.

In the present embodiment, the region management data storage unit 21h stores therein information in table form.

The fields of a region ID, x, y, w, h, and a decoder are provided in a region management table 231. Pieces of information arranged in a horizontal direction are associated with one another.

An ID for identifying a region is stored in the field of the region ID.

The x coordinate of the frequently updated region included in the acquired region management data is stored in the field of x. The y coordinate of the frequently updated region included in the acquired region management data is stored in the field of y. The width of the frequently updated region included in the acquired region management data is stored in the field of w.

The height of the frequently updated region included in the acquired region management data is stored in the field of h.

An ID used for identifying a decoder (moving image decompression codec) decoding a moving image stream identified by an ID used for identifying one of the encoders 141f, 142f, and 143f included in the acquired region management data is stored in the field of a decoder.

In the example illustrated, the first data indicates that a region of 200 pixels in width and 200 pixels in height from the position of coordinates (0, 0) to which ID="1" is assigned as an ID for identifying a region has been registered as the frequently updated region and ID: 0x012fafa for identifying the decoder 231e is assigned. In the same way, the second data and the third data also indicate that regions have been registered.

In addition, as the remote screen control unit 21, various kinds of integrated circuits or electronic circuits may be adopted. In addition, as part of a functional unit included in the remote screen control unit 21, another integrated circuit or another electronic circuit may also be adopted. For example, as examples of the integrated circuits, an ASIC, an FPGA, and the like may be cited. In addition, as examples of the electronic circuit, a CPU, an MPU, and the like may be cited.

Next, whole processing performed in the server device 10 will be described.

Figure 14:
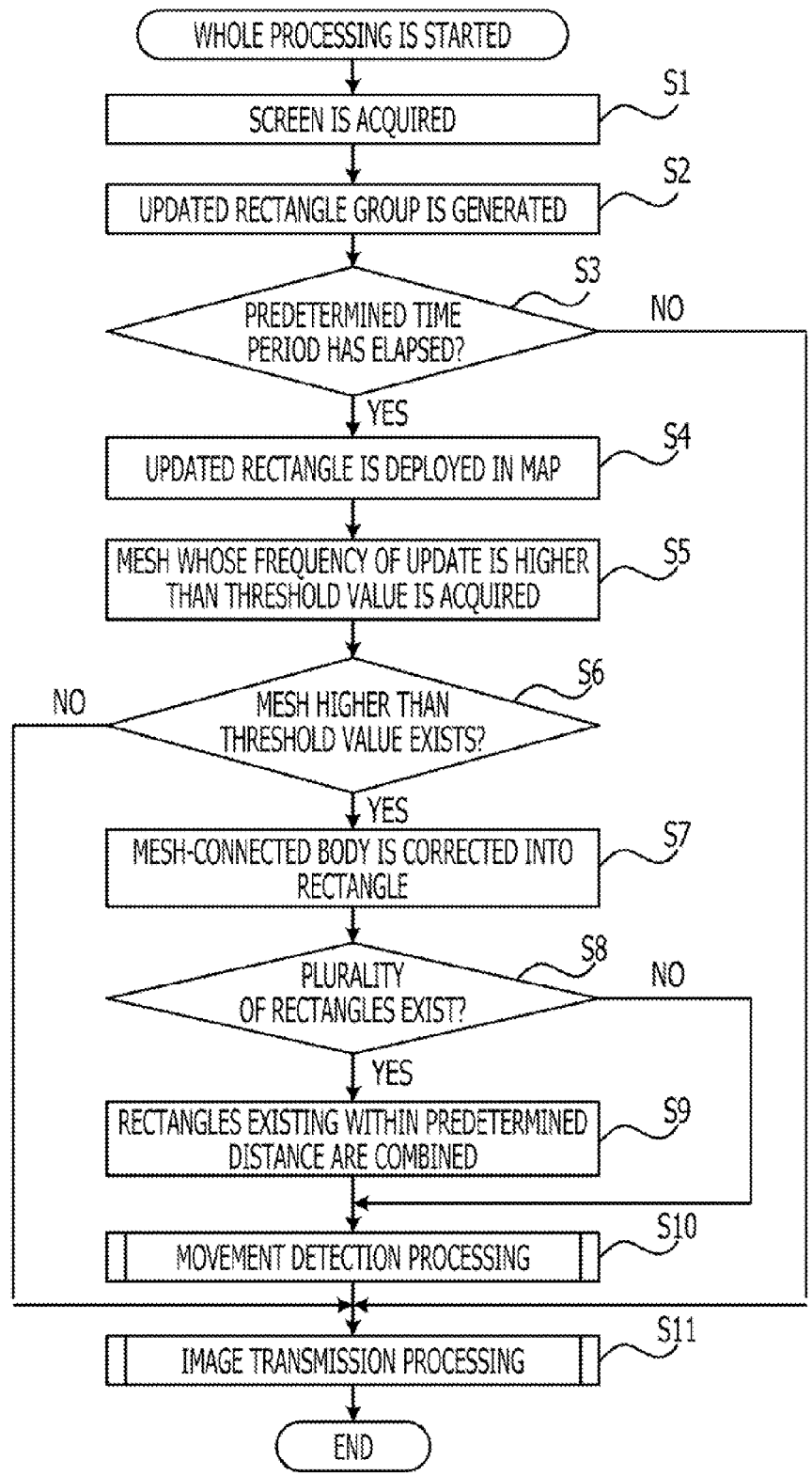
FIG. 14 is a flowchart illustrating whole processing performed in the server device.

FIG. 14 is a flowchart illustrating the whole processing performed in the server device.

This image transmission processing is processing executed by the server device 10, and activated when bitmap data is drawn in the frame buffer 13.

[Step S1] When bitmap data is drawn in the frame buffer 13, the screen generation unit 14b stores the data of the frame buffer 13 in the working internal memory. After that, the processing transits to Step S2.

[Step S2] After putting together pixels in portions in which changes have occurred from the previous frame, the screen generation unit 14b generates the image of an updated rectangle shaped in the form of a rectangle. After that, the processing transits to Step S3.

[Step S3] The update-frequency judgment unit 14c stores the updated rectangle generated by the screen generation unit 14b in a working internal memory not illustrated. At this time, the update-frequency judgment unit 14*c* determines whether or not a predetermined time period has elapsed after the storage of the updated rectangle was started. When the predetermined time period has not elapsed after the storage of the updated rectangle was started (Step S3: No), the processing transits to Step S11. When the predetermined time period has elapsed after the storage of the updated rectangle was started (Step S3: Yes), the processing transits to Step S4.

[Step S4] The update-frequency judgment unit 14*c* sequentially deploys the image of the updated rectangle in the map 30 used for judging the frequency of update, in accordance with the position and size of the updated rectangle stored in the working internal memory. After that, the processing transits to Step S5.

[Step S5] The update-frequency judgment unit 14*c* acquires the mesh 31 whose frequency of update exceeds the threshold value, from among the meshes 31 included in the map 30. After that, the processing transits to Step S6.

[Step S6] The updated region identification unit 14*d* determines whether or not the mesh 31 whose frequency of update exceeds the threshold value exists among the meshes 31 acquired by the update-frequency judgment unit 14*c*. When the mesh 31 whose frequency of update exceeds the threshold value does not exist (Step S6: No), since the frequently updated region does not exist in the desktop screen, the processing transits to Step S11. On the other hand, when the mesh 31 whose frequency of update exceeds the threshold value exists (Step S6: Yes), the processing transits to Step S7.

[Step S7] The updated region identification unit 14*d* corrects a mesh-connected body, in which the adjacent meshes 31 are connected to one another, into a rectangle. After that, the processing transits to Step S8.

[Step S8] The updated region identification unit 14*d* determines whether or not a plurality of rectangles after correction, namely, a plurality of candidates of the frequently updated region, exist. When a plurality of candidates of the frequently updated region exist (Step S8: Yes), the processing transits to Step S9. When a plurality of candidates of the frequently updated region do not exist (Step S8: No), the processing transits to Step S10.

[Step S9] The updated region identification unit 14*d* synthesizes a rectangle including candidates of the frequently updated region where distances between a plurality of candidates of the frequently updated region are less than or equal to a predetermined value. After that, the processing transits to Step S10.

[Step S10] The movement detection unit 14*i* executes movement detection processing. In addition, the movement detection processing will be described later. When the movement detection processing has finished, the processing transits to Step S11.

[Step S11] The updated region identification unit 14*d* executes image transmission processing. In addition, the image transmission processing will be described later. When continuous use discontinuation processing has finished, the whole processing is terminated.

This is the end of the description of the whole processing.

Next, the movement detection processing in Step S10 will be described in detail.

Figure 15:
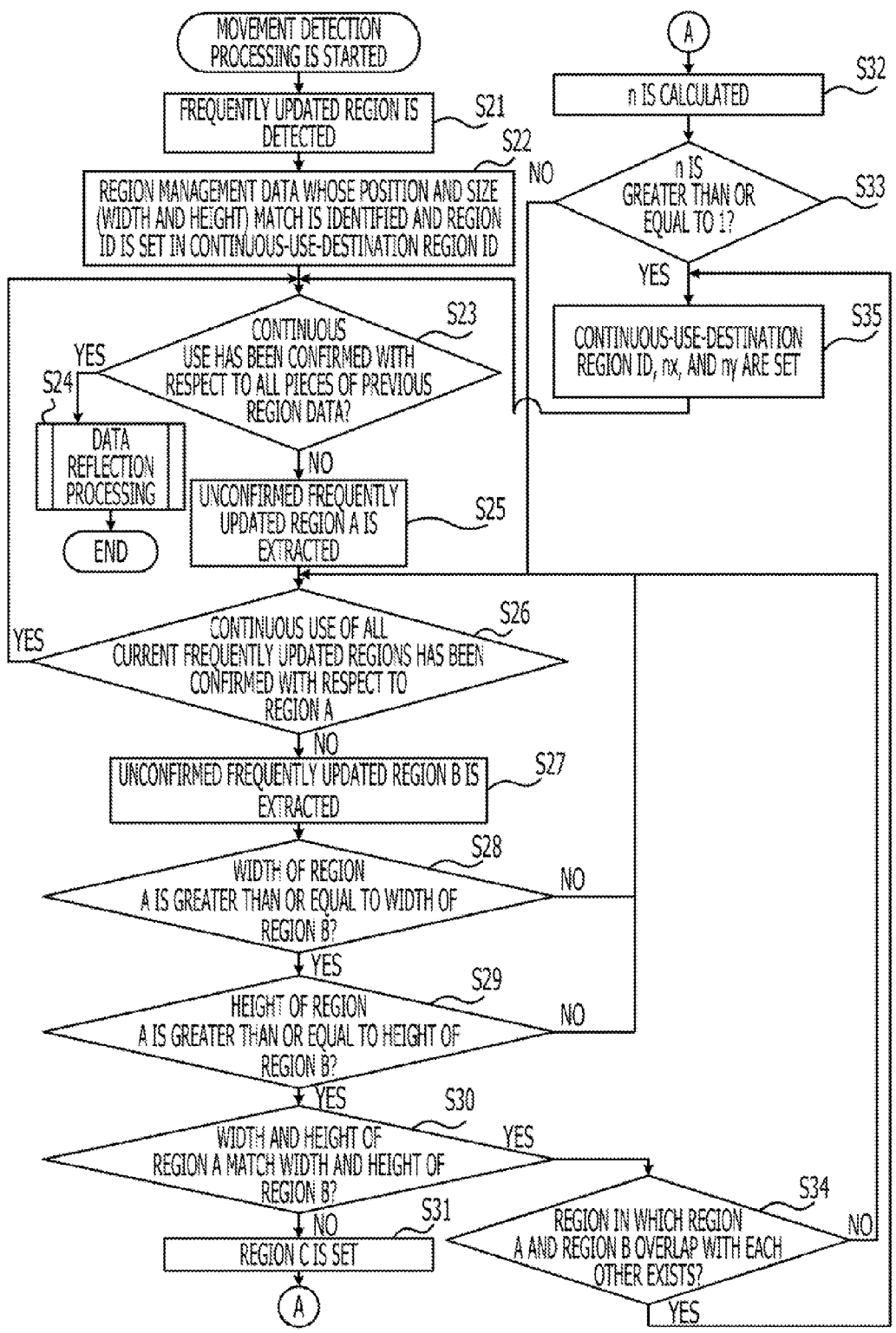
FIG. 15 is a flowchart illustrating movement detection processing performed in the server device of the second embodiment.

FIG. 15 is a flowchart illustrating the movement detection processing performed in the server device of the second embodiment. FIG. 15 illustrates a procedure in which, when newly setting the frequently updated region, the updated region identification unit 14*d* compares the frequently updated region newly set with the previous frequently updated region and detects the movement of the frequently updated region.

[Step S21] When the updated region identification unit 14*d* newly sets one frequently updated region or a plurality of frequently updated regions, the processing transits to Step S22.

[Step S22] The updated region identification unit 14*d* sends the region management data of the frequently updated region to the movement detection unit 14*i* and requests the movement detection unit 14*i* to detect the movement of the frequently updated region.

The movement detection unit 14*i* compares the list of the previous region management data stored in the previous region management table 142 with the region management data currently newly received. In addition, the movement detection unit 14*i* identifies region management data whose position and size (width and height) match. In addition, the movement detection unit 14*i* sets the region ID of the matching region management data in the fields of continuous-use-destination region IDs corresponding to all pieces of the identified previous region management data. After that, the processing transits to Step S23.

[Step S23] The movement detection unit 14*i* confirms whether or not the remaining pieces of the previous region management data are to be continuously used where no region ID has been set in the field of a continuous-use-destination region ID in the previous region management table 142 in Step S22. Specifically, the movement detection unit 14*i* determines whether or not processing operations in Step S25 and subsequent Steps have finished with respect to the remaining pieces of the previous region management data. When the processing operations in Step S25 and subsequent Steps have finished with respect to the remaining pieces of the previous region management data (Step S23: Yes), the processing transits to Step S24. When the (unconfirmed) previous region management data exists where the processing operations in Step S25 and subsequent Steps have not finished (Step S23: No), the processing transits to Step S25.

[Step S24] The movement detection unit 14*i* performs data reflection processing in which a moving image stream determined to be continuously used is reflected to the current frequently updated region. After that, the movement detection processing is terminated.

[Step S25] The movement detection unit 14*i* extracts the unconfirmed previous region management data. After that, the processing transits to Step S26.

Hereinafter, the frequently updated region identified by the previous region management data extracted in Step S25 is referred to as a "region A".

[Step S26] The movement detection unit 14*i* checks whether or not the confirmation of the continuous use of all the current frequently updated regions that have not been determined to be continuously used has finished with respect to the region A identified in Step S25. When the confirmation of the continuous use of all the current frequently updated regions has finished (Step S26: Yes), the processing transits to Step S23. When the confirmation of the continuous use of all the current frequently updated regions has not finished (Step S26: No), the processing transits to Step S27.

[Step S27] The movement detection unit 14*i* extracts the current region management data where the region ID has not been set in the continuous-use-destination region ID of the previous region management table 142 in Step S22. After that, the processing transits to Step S28. Hereinafter, the frequently updated region identified by the current region management data extracted in Step S27 is referred to as a "region B".

[Step S28] The movement detection unit 14*i* compares the width of the region A identified in Step S25 with the width of the region B identified in Step S27. In addition, the movement detection unit 14*i* determines whether or not the width of the region A is greater than or equal to the width of the region B. When the width of the region A is smaller than the width of the region B (Step S28: No), the processing returns to Step S26. When the width of the region A is greater than or equal to the width of the region B (Step S28: Yes), the processing transits to Step S29.

[Step S29] The movement detection unit 14*i* compares the height of the region A with the height of the region B, and determines whether or not the height of the region A is greater than or equal to the height of the region B. When the height of the region A is smaller than the height of the region B (Step S29: No), the processing returns to Step S26. When the height of the region A is greater than or equal to the height of the region B (Step S29: Yes), the processing transits to Step S30.

[Step S30] The movement detection unit 14*i* determines whether or not the width and the height of the region A completely match the width and the height of the region B, respectively. When the width and the height of the region A completely match the width and the height of the region B, respectively, (Step S30: Yes), the processing transits to Step S34. When the width and the height of the region A do not completely match the width and the height of the region B, respectively, (Step S30: No), the processing transits to Step S31.

[Step S31] The movement detection unit 14*i* extracts a region in the region A, which does not overlap with the region B, and sets a region C when the region A is minimally moved so that a non-overlapping region disappears. After that, the processing transits to Step S32.

[Step S32] The movement detection unit 14*i* calculates n from the above-mentioned Expression (1). After that, the processing transits to Step S33.

[Step S33] The movement detection unit 14*i* determines whether or not the n calculated in Step S32 is greater than or equal to "1". When the n is smaller than "1" (Step S33: No), the processing returns to Step S26. When the n is greater than or equal to "1" (Step S33: Yes), the processing transits to Step S35.

[Step S34] The movement detection unit 14*i* determines whether or not the region A and the region B overlap with each other. When the region A and the region B do not overlap with each other (Step S34: No), the processing returns to Step S26. When the region A and the region B overlap with each other (Step S34: Yes), the processing transits to Step S35.

[Step S35] The movement detection unit 14*i* determines that a moving image stream currently assigned to the region A is to be assigned to the region B. Specifically, the movement detection unit 14*i* stores the region ID of the current region management data corresponding to the region B in the field of the continuous-use-destination region ID corresponding to the previous region management data of the region A. Furthermore, the movement detection unit 14*i* stores coordinates for identifying the position of the region C, in the fields of nx and ny corresponding to the previous region management data of the region A. After that, the processing transits to Step S23.

This is the end of the description of the movement detection processing.

Next, the management data reflection processing in Step S24 will be described in detail.

Figure 16:
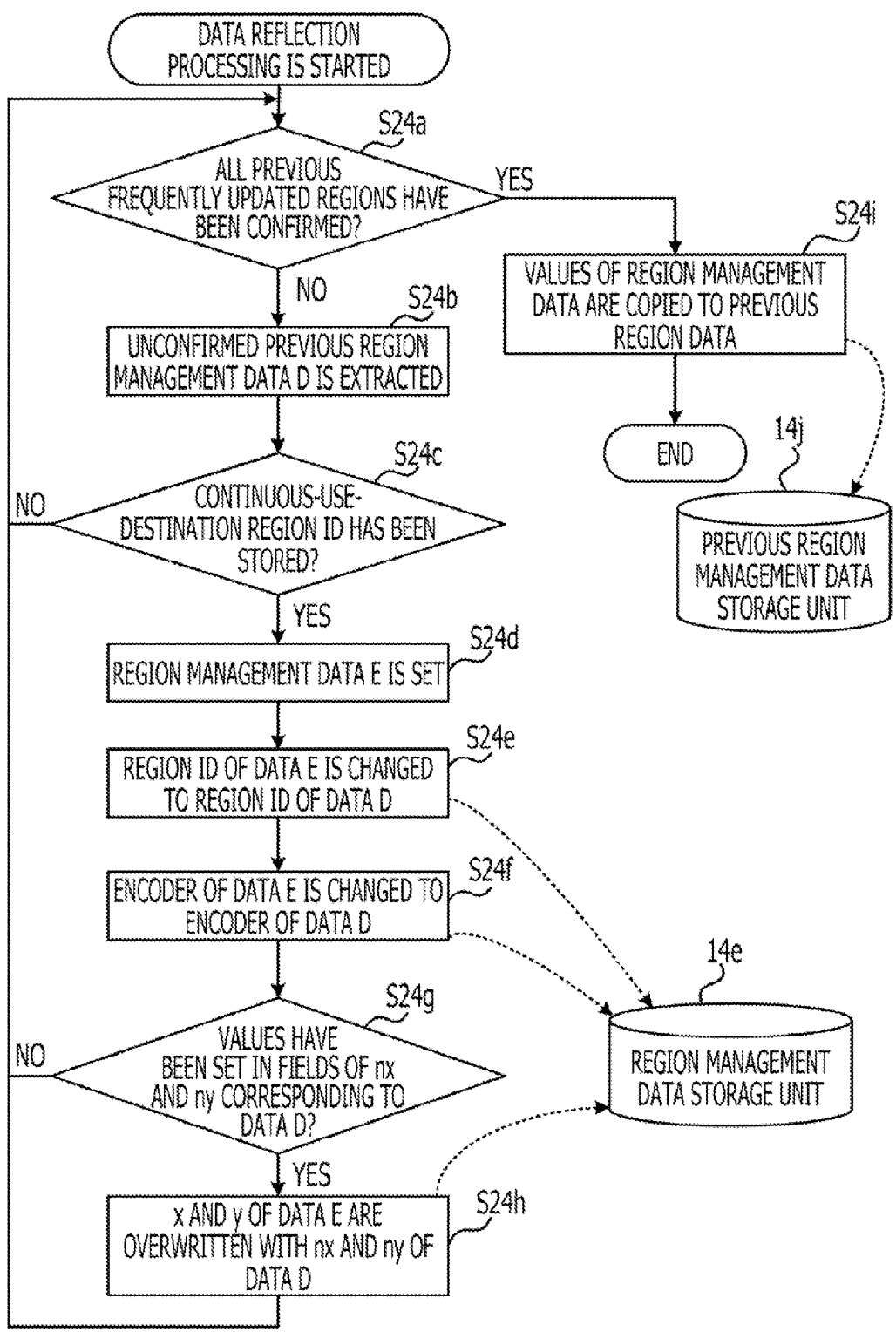
FIG. 16 is a flowchart illustrating data reflection processing of the second embodiment.

FIG. 16 is a flowchart illustrating the data reflection processing of the second embodiment.

[Step S24*a*] The movement detection unit 14*i* determines whether or not values determined to be continuously used, namely, values set in the fields of the continuous-use-destination region ID, nx, and ny, have been reflected to the region management table 141. Specifically, the movement detection unit 14*i* determines whether or not processing operations in Step S24*b* and subsequent Steps have been performed with respect to all pieces of the previous region management data stored in the previous region management table 142. When processing operations in Step S24*b* and subsequent Steps have been completed with respect to all pieces of the previous region management data (Step S24*a*: Yes), the processing transits to S24*i*. When the (unconfirmed) previous region management data where processing operations in Step S24*b* and subsequent Steps have not been completed (Step S24*a*: No), the processing transits to Step S24*b*.

[Step S24*b*] The movement detection unit 14*i* extracts the unconfirmed previous region management data. After that, the processing transits to Step S24*c*. Hereinafter, the previous region management data extracted in Step S24*b* is referred to as "previous region management data D".

[Step S24*c*] The movement detection unit 14*i* confirms whether or not an ID has been stored in the field of the continuous-use-destination region ID corresponding to the region management data D extracted in Step S24*b*. When an ID has not been stored in the field of the continuous-use-destination region ID (Step S24*c*: No), the processing returns to Step S24*a*. When an ID has been stored in the field of the continuous-use-destination region ID (Step S24*c*: Yes), the processing transits to Step S24*d*.

[Step S24*d*] The movement detection unit 14*i* extracts the region management data of the region management table 141, identified by the ID set in the field of the continuous-use-destination region ID. After that, the processing transits to Step S24*e*. Hereinafter, the region management data extracted in Step S24*d* is referred to as "region management data E".

[Step S24*e*] The movement detection unit 14*i* changes the ID in the field of the region ID of the region management data E to the region ID of the previous region management data D. After that, the processing transits to Step S24*f*.

[Step S24*f*] The movement detection unit 14*i* changes the encoder of the region management data E to the encoder of the previous region management data D. After that, the processing transits to Step S24*g*.

[Step S24*g*] The movement detection unit 14*i* determines whether or not values have been stored in the fields of nx and ny corresponding to the previous region management data D. When values have not been stored in the fields of nx and ny (Step S24*g*: No), the processing returns to Step S24*a*. When values have been stored in the fields of nx and ny (Step S24*g*: Yes), the processing transits to Step S24*h*.

[Step S24*h*] The movement detection unit 14*i* overwrites the values of the fields of x and y of the region management data E with the values of the fields of nx and ny corresponding to the previous region management data D. After that, the processing returns to Step S24*a*.

[Step S24*i*] The movement detection unit 14*i* clears the whole content stored in the previous region management table 142. In addition, the movement detection unit 14*i* stores the content of the region management data, stored in the region management table 141, in the previous region management table 142. After that, the data reflection processing is terminated.

This is the end of the description of the data reflection processing.

Next, the image transmission processing in Step S11 will be described.

Figure 17:
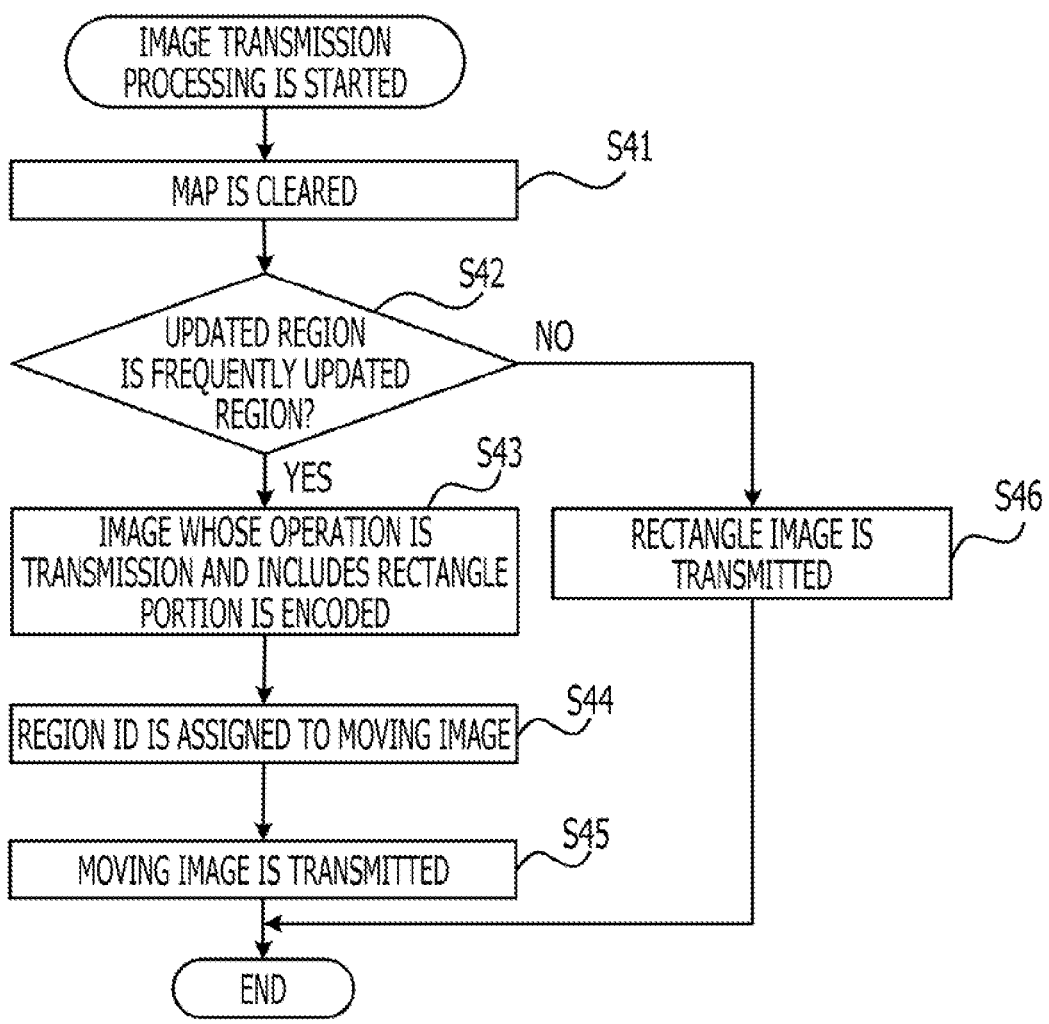
FIG. 17 is a flowchart illustrating image transmission processing of the second embodiment.

FIG. 17 is a flowchart illustrating the image transmission processing of the second embodiment.

[Step S41] The updated region identification unit 14*d* clears the update count of the mesh 31 mapped to the map 30. After that, the processing transits to Step S42.

[Step S42] The updated region identification unit 14*d* determines whether or not an updated rectangle generated by the screen generation unit 14*b* is included in one of pieces of the region management data stored in the region management data storage unit 14*e*, namely, the generated updated rectangle is included in one of regions where the second transmission unit 14*h* are transmitting a moving image stream. When the updated rectangle is included in the frequently updated region (Step S42: Yes), the processing transits to Step S43. When the updated rectangle is not included in the frequently updated region (Step S42: No), the processing transits to Step S46.

[Step S43] After clipping the bitmapped image of a portion corresponding to the frequently updated region from among the bitmap data drawn in the frame buffer 13, the updated region identification unit 14*d* causes a corresponding encoder from among the encoders 141*f* to 143*f* to encode the bitmapped image. After that, the processing transits to Step S44.

[Step S44] When having received an encoded image encoded by the encoder, the updated region identification unit 14*d* sends the encoded image to the second transmission unit 14*h* with assigning a corresponding region ID to the encoded image. After that, the processing transits to Step S45.

[Step S45] The second transmission unit 14*h* transmits, to the client device 20, the encoded image of the frequently updated region encoded. After that, the image transmission processing is terminated.

[Step S46] The first transmission unit 14*g* transmits the image and the attribute information of the updated rectangle to the client device 20. After that, the image transmission processing is terminated.

This is the end of the description of the image transmission processing.

Figure 18:
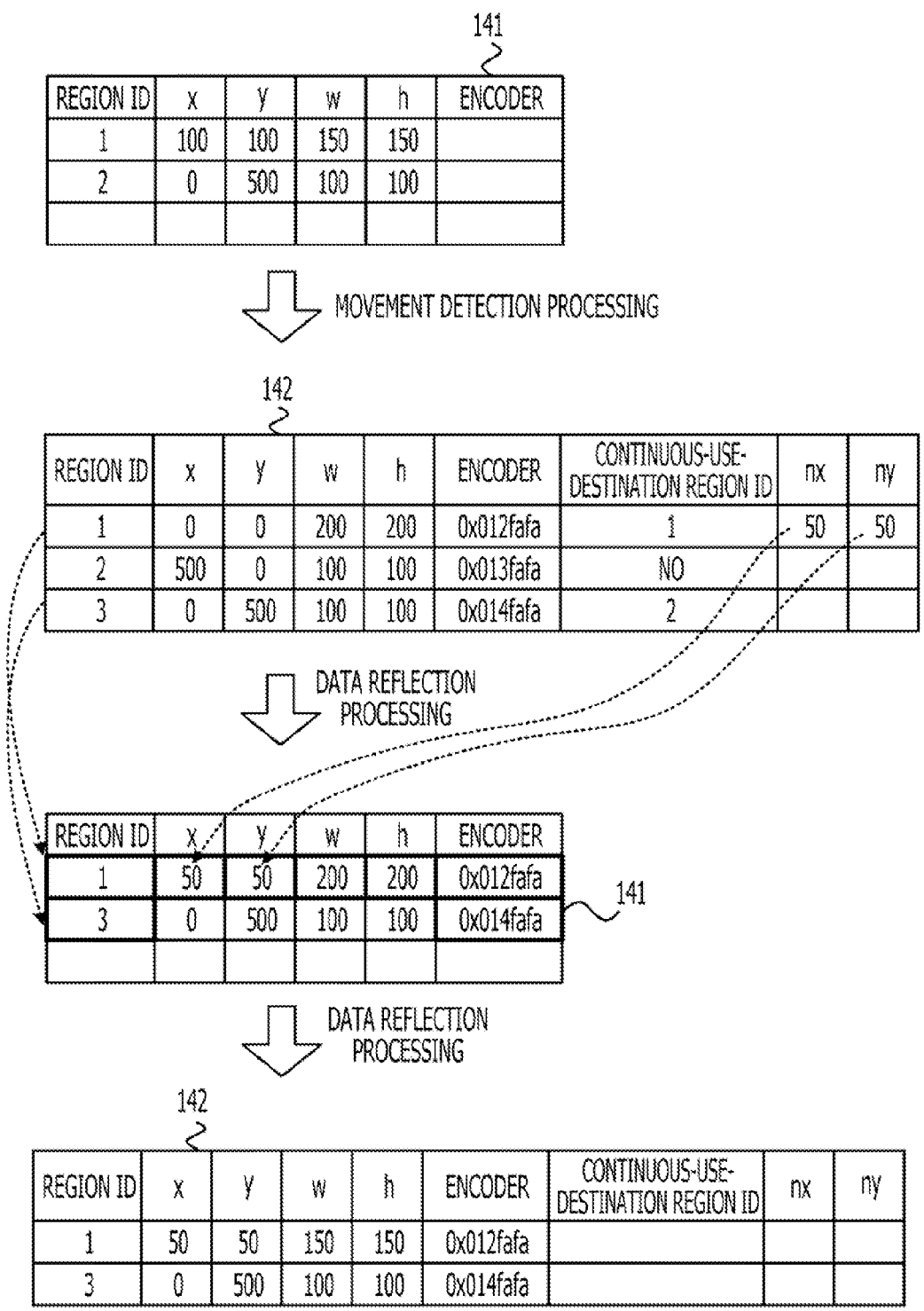
FIG. 18 is a diagram illustrating a specific example of the data reflection processing of the second embodiment.

FIG. 18 is a diagram illustrating a specific example of the data reflection processing of the second embodiment.

In the example illustrated in the drawing, the frequently updated region that can be continuously used is extracted from the previous frequently updated region and the new frequently updated region, and coordinates for identifying the position of the frequently updated region that can be continuously used have been recorded in the fields of the continuous-use-destination region ID, nx, and ny in the previous region management table 142. Specifically, since the previous region management data of the field of the region ID=1 in the previous region management table 142 corresponds to the continuous-use-destination region ID=1, the previous region management data has been determined to be continuously used on the basis of the region ID=1 of the new frequently updated region. In addition, since "50" has been stored in each of the fields of nx and ny, it is indicated that movement from coordinates (0, 0) to coordinates (50, 50) is necessary.

The previous region management data in the field where the region ID is "2" is not to be continuously used.

Since the previous region management data in the field where the region ID is "3" corresponds to the continuous-use-destination region ID=2, the previous region management data has been determined to be continuously used on the basis of the region ID=2 of the new frequently updated region. In addition, since no value is stored in the fields of nx and ny, it is indicated that it is not necessary for coordinates to be moved.

The state of region position identification data after these pieces of information relating to continuous use have been reflected to the region management table 141 on the upper side of FIG. 18 corresponds to the region management table 141 on the lower side of FIG. 18. In the region management table 141 on the lower side of FIG. 18, it turns out that information relating to a region ID, a width, a height, an encoder has been updated by the previous region management data and position information (x, y) has also been updated with respect to the data of the region ID=1.

After that, all contents stored in the previous region management table 142 are cleared. In addition, the content of the region management data stored in the region management table 141 is stored in the previous region management table 142.

According to the above-mentioned processing, since the server device 10 detects the movement of the frequently updated region, and the frequently updated region is allowed to be continuously used, it is possible to reduce a data transmission amount.

Next, the movement detection processing performed in the client device 20 will be described.

Figure 19:
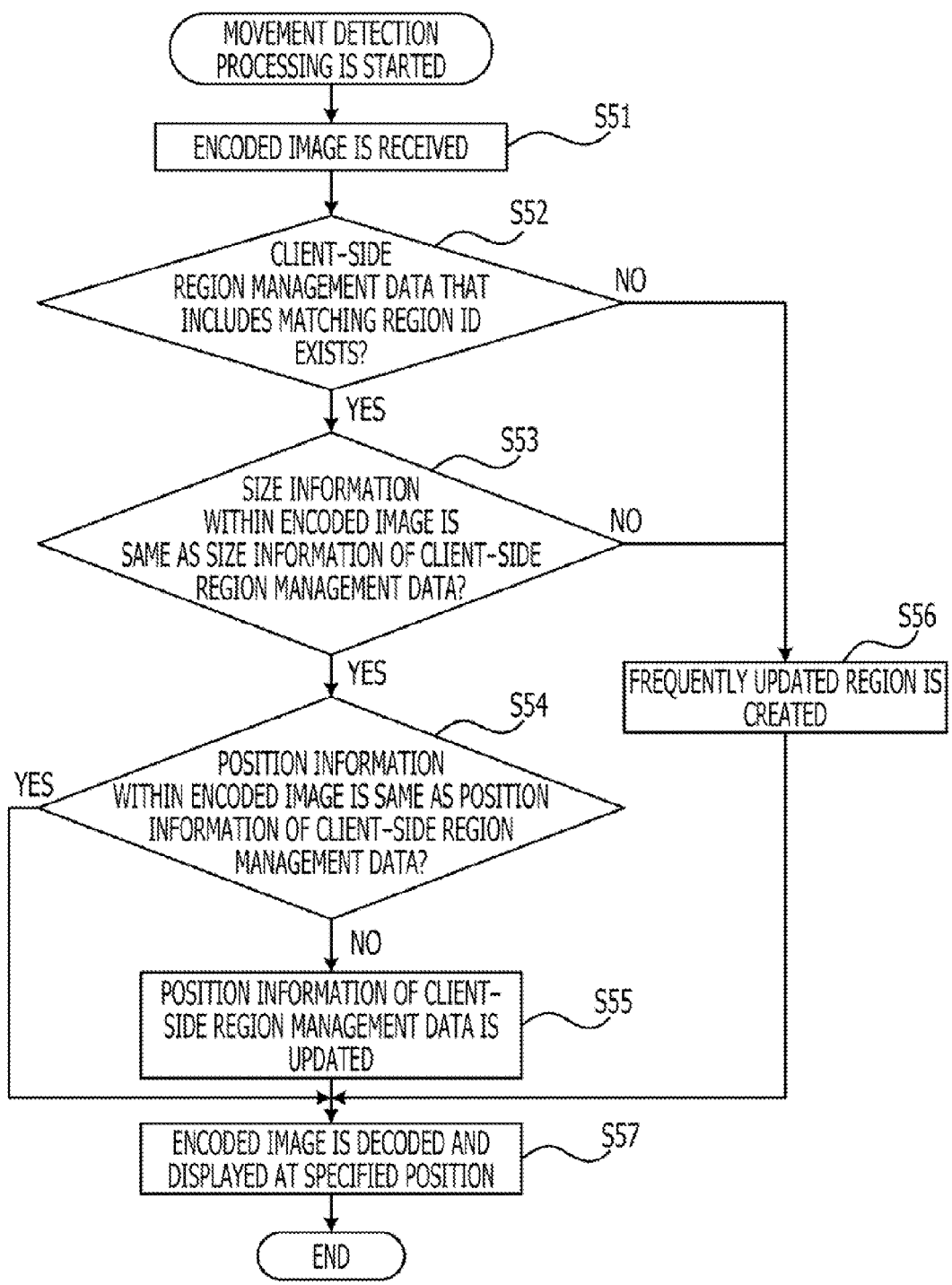
FIG. 19 is a flowchart illustrating movement detection processing performed in the client device of the second embodiment.

FIG. 19 is a flowchart illustrating the movement detection processing performed in the client device of the second embodiment.

FIG. 19 illustrates a procedure in which, when the client device 20 newly receives image data (moving image data) from the second reception unit 21*d*, the received image data is compared with the content of region management data stored in the region management data storage unit 21*h* and the movement of the frequently updated region is detected.

[Step S51] When having newly received the encoded image (moving image stream), the client device 20 requests the display position change detection unit 21*g* to detect the movement of the frequently updated region.

[Step S52] The display position change detection unit 21*g* compares the region ID of the region management data (hereinafter, referred to as "client-side region management data") stored in the region management data storage unit 21*h* with a region ID assigned to the currently received encoded image. In addition, the display position change detection unit 21*g* determines whether or not the client-side region management data that includes a region ID matching the region ID assigned to the encoded image exists. When the client-side region management data that includes the matching region ID exists (Step S52: Yes), the processing transits to Step S53. When the client-side region management data that includes the matching region ID does not exist (Step S52: No), the processing transits to Step S56.

[Step S53] The display position change detection unit 21*g* compares size information (width and height), included in the client-side region management data whose region ID matches, with size information included in the currently received encoded image. In addition, the display position change detection unit 21*g* determines whether or not the size information included in the client-side region management data matches the size information included in the encoded image. When the size information included in the client-side region management data matches the size information included in the encoded image (Step S53: Yes), the processing transits to Step S54. When the size information included in the client-side region management data does match the size information included in the encoded image (Step S53: No), the processing transits to Step S56.

[Step S54] The display position change detection unit 21*g* refers to position information included in the client-side region management data whose region ID matches and position information included in the newly received encoded image, and determines whether or not the position information included in the client-side region management data matches the position information included in the encoded image. When the position information included in the client-side region management data matches the position information included in the encoded image (Step S54: Yes), the processing transits to Step S57. When the position information included in the client-side region management data does not match the position information included in the encoded image (Step S54: No), the processing transits to Step S55.

[Step S55] The display position change detection unit 21g changes the position information of the client-side region management data to the position information included in the received encoded image. After that, the processing transits to Step S57.

[Step S56] The display position change detection unit 21g newly creates the frequently updated region. In addition, after copying a region ID, a position, and a size included in the encoded image to the client-side region management data, the display position change detection unit 21g selects a decoder from among the decoders 211e to 213e, and assigns the selected decoder to the created frequently updated region (writes the selected decoder in the decoder field of the client-side region management data). After that, the processing transits to Step S57.

[Step S57] The display position change detection unit 21g decodes the received encoded image using the assigned decoder, and displays the decoded image data at a display position set in the client-side region management data. After that, the display position change detection processing is terminated.

According to the above-mentioned processing, since the client device 20 detects the movement of the frequently updated region, and can display the image at a proper position, it is also possible to display a proper screen when the frequently updated region is continuously used on a server device 10 side.

As described above, according to the information processing system 5, the server device 10 is caused to execute the movement detection processing. Accordingly, in a situation in which screen updating frequently occurs at a random part in such a way as at the time of the reproduction of a moving image, at the time of the use of a CAD application, or the like, the change of the frequently updated region is detected as the movement thereof in a proper case, and it is possible to continuously use a moving image stream. Accordingly, since it is possible to enhance data compression efficiency, it is possible to accelerate a response time to an operation as a result.

Third Embodiment

Next, the information processing system of a third embodiment will be described.

Hereinafter, with respect to the information processing system of the third embodiment, differences between the information processing systems of the third embodiment and the second embodiment will be mainly described, and the descriptions of similar matters will be omitted.

The information processing system of the third embodiment differs in the data reflection processing from the second embodiment.

In the information processing system 5 illustrated in the second embodiment, when the movement of the frequently updated region is detected and the frequently updated region is continuously used, the region continues being updated after that. In addition to this, when the region continues being processed as the frequently updated region, a state turns out to continue in which the frequently updated region is also continuously used. In this case, for example, depending on the value of n calculated in Step S32 in FIG. 15, owing to the continuous use, a data communication amount increases in some cases. For example, in a case in which the continuous use of the frequently updated region is determined and n is calculated to be 5, when that frequently updated region is changed 10 times, while the continuous use results in a smaller communication amount up until the fifth change, the continuous use results in a larger data communication amount after the sixth change.

On the other hand, in the third embodiment, the continuous use of the frequently updated region is discontinued after the sixth change and the frequently updated region is changed so that data transmission is performed with a region of small size according to a primary updated region being regarded as the frequently updated region. Accordingly, processing for suppressing the data communication amount is executed.

FIG. 20 is a diagram illustrating an example of a region management table included in the server device of the third embodiment.

Compared with the region management table 141, the fields of n, an encode count, xo, yo, wo, and ho are further added in the region management table 143 of the third embodiment.

The value of n calculated in S32 in FIG. 5 with respect to each frequently updated region has been stored in the field of n (only when n has been calculated).

The number of times encoding has been performed when the frequently updated region of a corresponding record is continuously used has been stored in the field of the encode count. In the example illustrated in the drawing, the encoding has been performed one time.

In addition, the position and the size of the frequently updated region previously detected are individually stored in the fields of xo, yo, wo, and ho.

Next, movement detection processing performed in the server device 10 of the third embodiment will be described.

Figure 21:
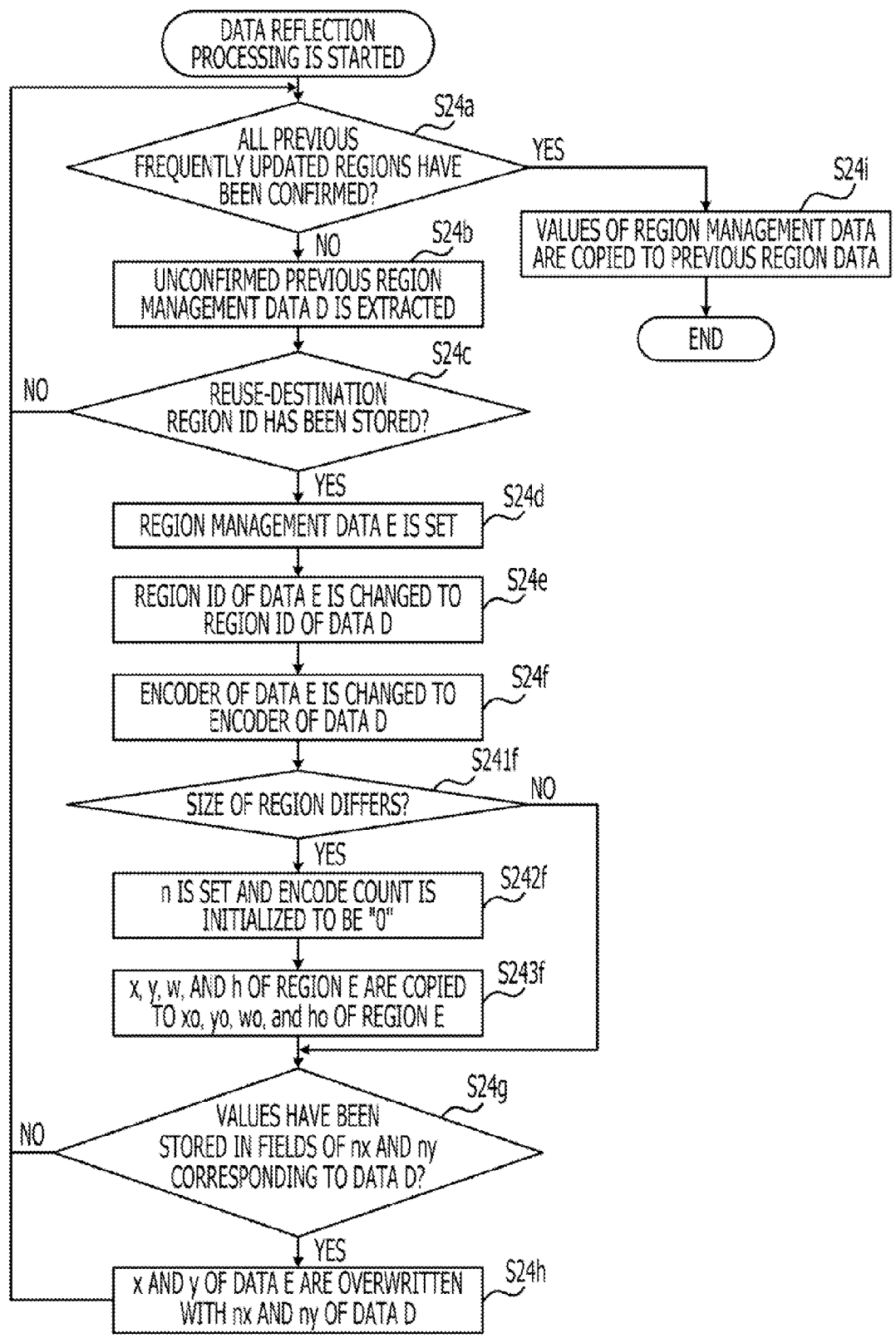
FIG. 21 is a flowchart illustrating data reflection processing of the third embodiment.

FIG. 21 is a flowchart illustrating the data reflection processing of the third embodiment.

FIG. 21 illustrates a procedure in which, when having newly detected the frequently updated region, the server device 10 compares the frequently updated region newly detected with the frequently updated region previously detected and detects the movement of the frequently updated region. Since processing operations in Step S24a to S24f and Step S24g to S24i are substantially the same processing operations as those in the second embodiment, the descriptions thereof will be omitted.

[Step S241f] The movement detection unit 14i determines whether or not the size of a region identified by the previous region management data D differs from the size of a region identified by the region management data E. When the size differs (Step S241f: Yes), the processing transits to Step S242f. When the size is same (Step S241f: No), the processing transits to Step S24g.

[Step S242f] The movement detection unit 14i sets a value, calculated using substantially the same method as n calculated in Step S32, in the field of n corresponding to the region management data E in the region management table 143. In addition, the field of the encode count is initialized to be "0". At this time, the position or height of the previous region management data D and the position or height of the region management data E are used for the calculation of n. After that, the processing transits to Step S243f.

While, here, a method is described in which a value is set in the field of n of the region management data E by recalculating n, a method may be adopted where a field in which n is written is prepared in the previous region management data D, n calculated in Step S32 is recorded in the previous region management data D, and n recorded in the previous region management data D is copied in place of the recalculation of n in Step S242f.

[Step S243f] The movement detection unit 14i copies values stored in the fields of x, y, w, and h to the fields of xo, yo, wo, and ho corresponding to the region management data E in the region management table 143. After that, the processing transits to Step S24g.

According to the above-mentioned processing, it is possible to record, in the region management data, information for discontinuing the continuous use of the frequently updated region.

Next, the image transmission processing of the third embodiment will be described.

Figure 22:
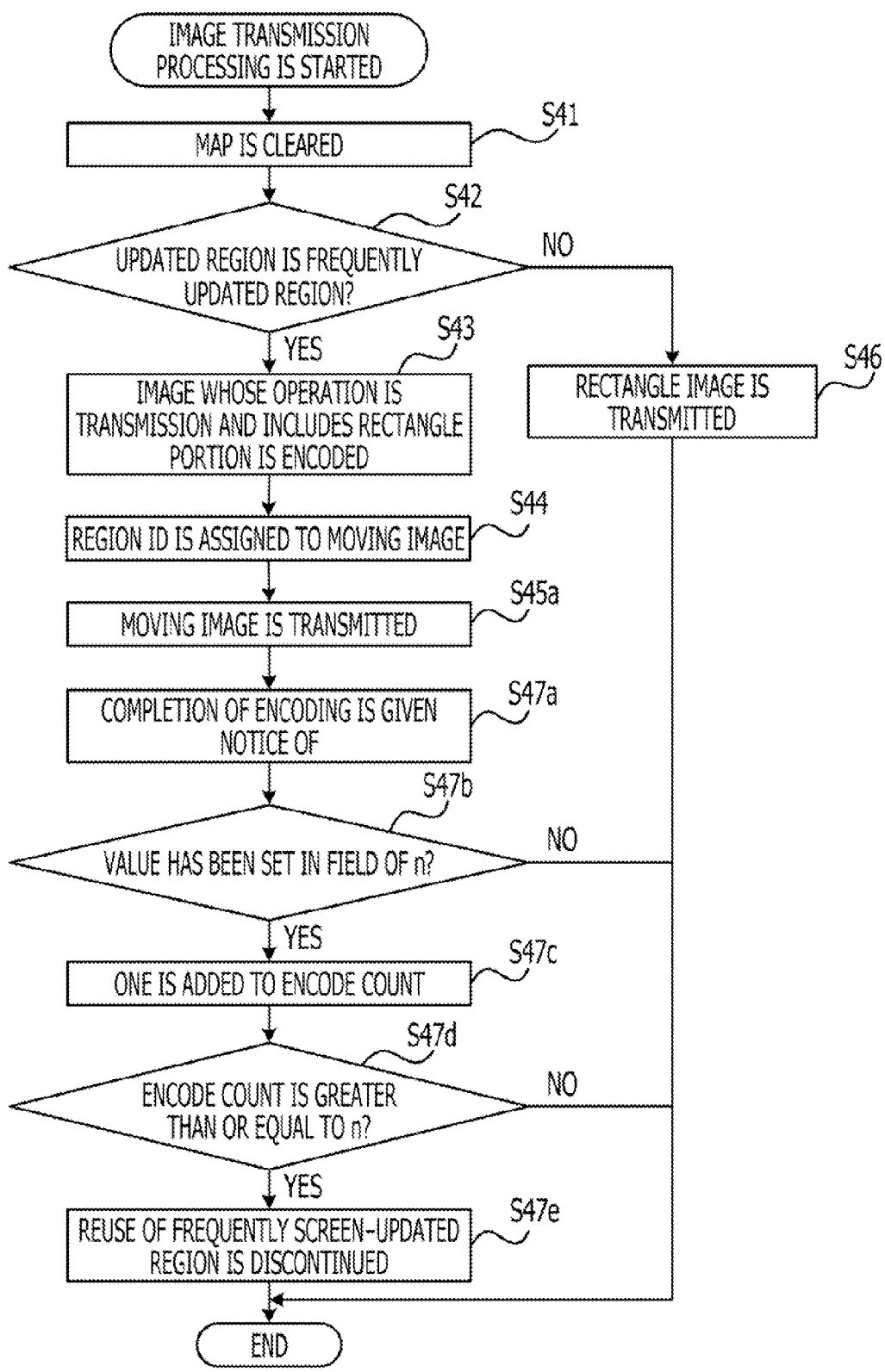
FIG. 22 is a flowchart illustrating a procedure of image transmission processing of the third embodiment.

FIG. 22 is a flowchart illustrating the procedure of the image transmission processing of the third embodiment.

FIG. 22 illustrates a procedure performed until the continuous use of the frequently updated region is discontinued when the server device 10 has newly detected an updated region. Since processing operations in Step S41 to S44, and S46 are substantially the same processing operations as those in the second embodiment, the descriptions thereof will be omitted.

[Step S45a] The second transmission unit 14h transmits the moving image stream of the encoded frequently updated region to the client device 20. After that, the processing transits to Step S47a.

[Step S47a] The updated region identification unit 14d notifies the movement detection unit 14i of the completion of encoding. After that, the processing transits to Step S47b.

[Step S47b] The movement detection unit 14i that has received notification refers to the region management table 143, and determines whether or not a value has been set in the field of n of the region management data where the encoding has been completed. When a value has been set (Step S47b: Yes), the processing transits to Step S47c. When a value has not been set (Step S47b: No), the image transmission processing is terminated.

[Step S47c] The movement detection unit 14i adds one to the value of the field of the encode count corresponding to the region management data in the region management table 143, where the encoding has been completed. After that, the processing transits to Step S47d.

[Step S47d] The movement detection unit 14i determines whether or not the value of the field of the encode count corresponding to the region position identification data where the encoding has been completed is greater than or equal to n set in the field of n. When the value of the field of the encode count is greater than or equal to n (Step S47d: Yes), the processing transits to Step S47e. When the value of the field of the encode count is smaller than n (Step S47d: No), the image transmission processing is terminated.

[Step S47e] The movement detection unit 14i discontinues the continuous use of the frequently updated region and terminates the image transmission processing. Specifically, the movement detection unit 14i terminates the encoder used for this frequently updated region, copies the values of xo, yo, wo, and ho written in the region management data to x, y, w, and h of the same region management data, newly creates an encoder using w and h as parameters, and newly reassigns a region ID. After that, the image transmission processing is terminated.

This is the end of the description of the image transmission processing of the third embodiment.

According to the information processing system of the third embodiment, the same advantageous effect as the information processing system of the second embodiment is obtained.

In addition, according to the information processing system of the third embodiment, when a data communication amount further increases owing to the continuous use of the frequently updated region, it is possible to discontinue the continuous use, and hence it is possible to substantially prevent the data communication amount from increasing.

Fourth Embodiment

Next, the information processing system of a fourth embodiment will be described.

Hereinafter, with respect to the information processing system of the fourth embodiment, differences between the information processing systems of the fourth embodiment and the second embodiment will be mainly described, and the descriptions of substantially similar matters will be omitted.

In the information processing device illustrated in the second embodiment, as illustrated in Expression (2) and Expression (3), movement is detected as the target of continuous use only when the frequently updated region newly set is smaller in size than or equal in size to the previous frequently updated region. In addition to this, in the fourth embodiment, movement is also detected as the target of continuous use when the frequently updated region newly detected is larger in size than the previous frequently updated region.

Figure 23A:
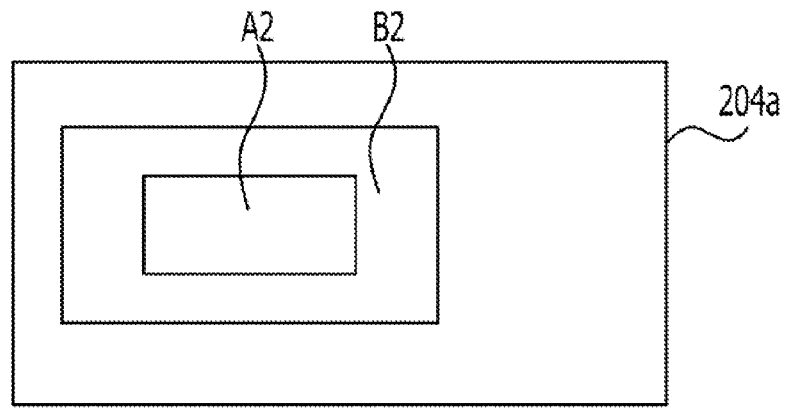
FIG. 23A to FIG. 23C are diagrams illustrating an example of movement detection processing performed in a server device of a fourth embodiment.
Figure 23B:
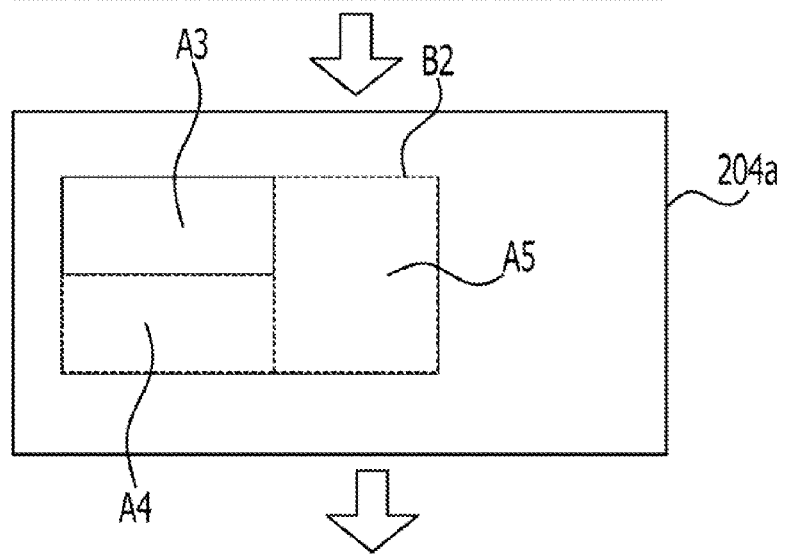
Figure 23C:
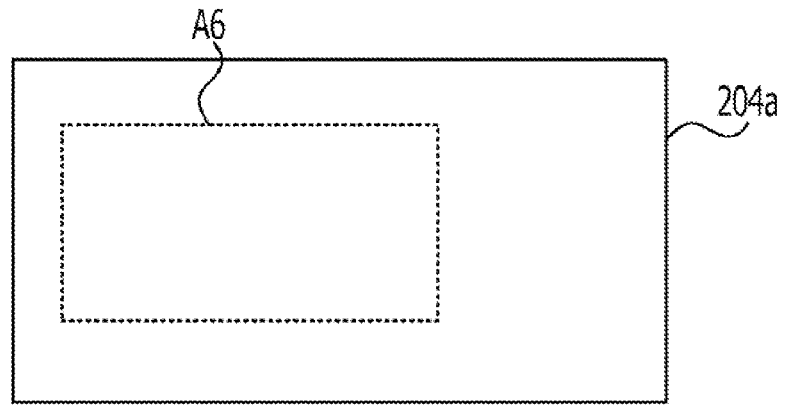

FIG. 23A to FIG. 23C are diagrams illustrating an example of movement detection processing performed in the server device of the fourth embodiment.

FIG. 23A illustrates a case in which a new frequently updated region B2 is greater in size than a previous frequently updated region A2 displayed in the display device 204a.

In this case, as illustrated in FIG. 23B, the server device 10 of the present embodiment continuously uses the previous frequently updated region A2 by setting the previous frequently updated region A2 in a region A3 corresponding to a region to which the previous frequently updated region A2 is moved at the corner of the top left of the new frequently updated region B2, and with respect to a protruding portion in the new frequently updated region B2, two regions A4 and A5 are independently created and transmitted to the client device 20. In addition, a situation is illustrated in which, after a predetermined period of time has elapsed, the continuous use of the frequently updated region A2 is discontinued and an image is transmitted as one frequently updated region A6.

FIG. 24 is a diagram illustrating the region management table of the fourth embodiment.

The field of an integration instruction time [ms] in which a time when the continuous use of the frequently updated region is discontinued is stored is further provided in the region management table 144 of the fourth embodiment.

In FIG. 24, in each of pieces of the region management data extending from the region ID=1 to the region ID=3, "120191" is stored in the field of the integration instruction time. This indicates that the frequently updated region is segmented so that the previous frequently updated region is continuously used, and indicates that the continuous use is discontinued at a time specified by the integration instruction time (after 120191 [ms] has elapsed from system activation in FIG. 24) and a frequently updated region is to be transmitted as one frequently updated region.

Next, movement detection processing performed in the server device 10 of the fourth embodiment will be described.

Figure 25:
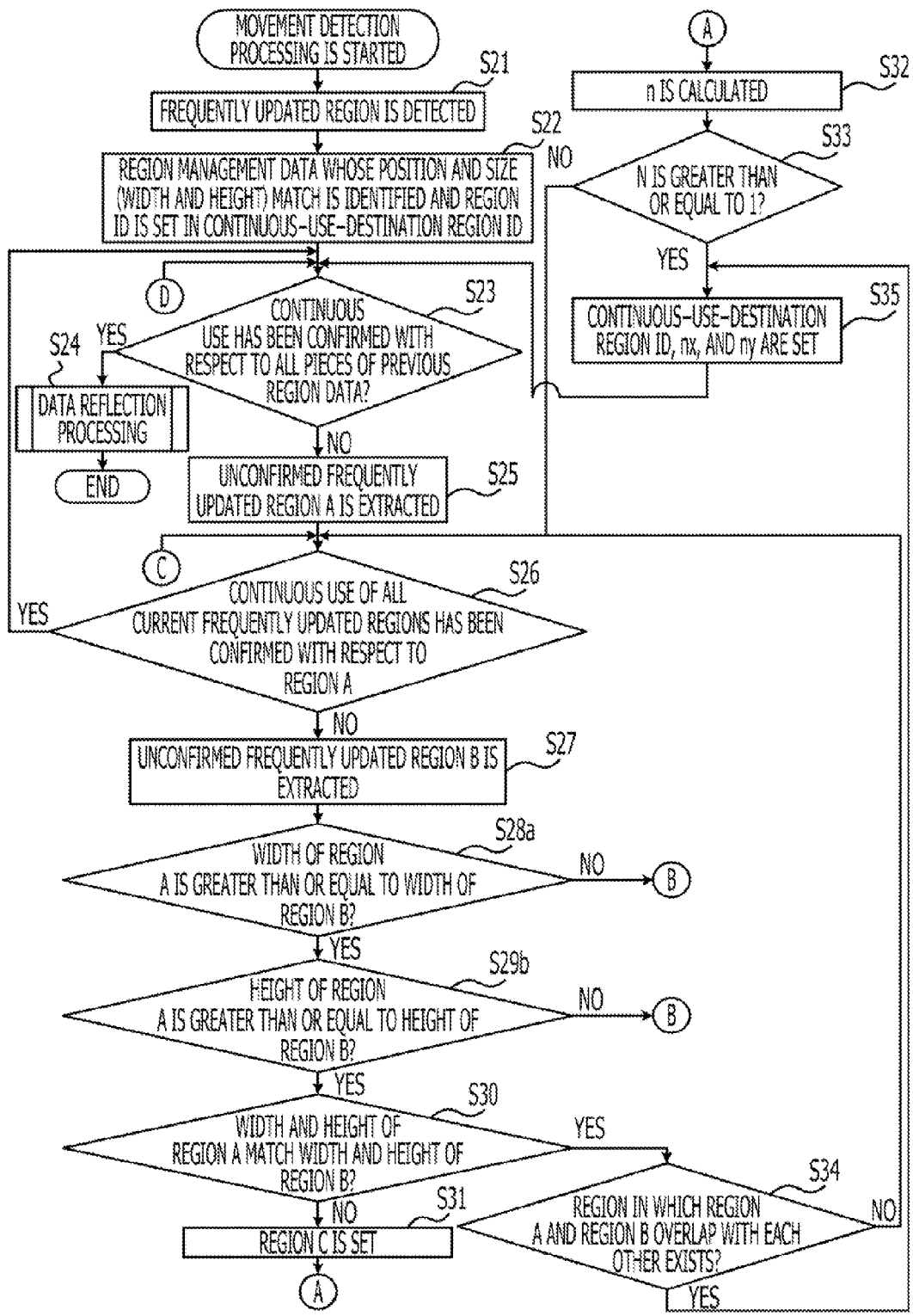
FIG. 25 is a flowchart illustrating movement detection processing performed in the server device of the fourth embodiment.
Figure 26:
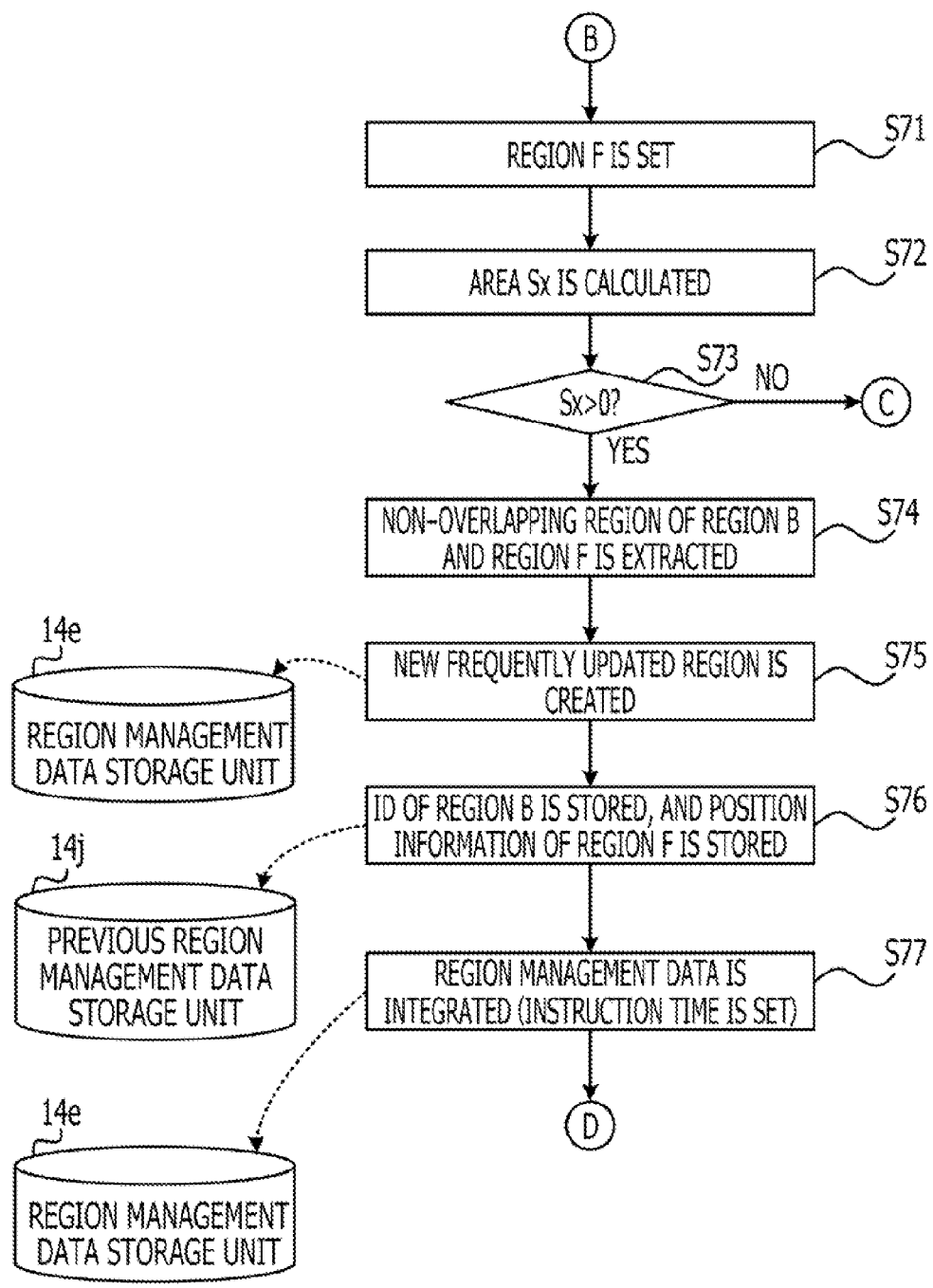
FIG. 26 is a flowchart illustrating movement detection processing performed in the server device of the fourth embodiment.

FIGS. 25 and 26 are flowcharts illustrating the movement detection processing performed in the server device of the fourth embodiment.

FIGS. 25 and 26 illustrate a procedure in which, when having newly detected the frequently updated region, the server device 10 compares the frequently updated region newly detected with the frequently updated region previously detected and detects the movement of the frequently updated region. Since processing operations in and previous to S27 are substantially the same processing operations as those in the second embodiment, the descriptions thereof will be omitted.

[Step S28a] The movement detection unit 14i compares the width of the region A extracted in Step S25 with the width of the region B extracted Step S27. In addition, the movement detection unit 14i determines whether or not the width of the region A is greater than or equal to the width of the region B. When the width of the region A is greater than or equal to the width of the region B (Step S28a: Yes), the processing transits to Step S29a. When the width of the region A is smaller than the width of the region B (Step S28a: No), the processing transits to Step S71. In addition, the frequently updated region A2 illustrated in FIG. 23A is an example of the region A, and the region B2 is an example of the region B.

[Step S29a] The movement detection unit 14i compares the height of the region A with the height of the region B, and determines whether or not the height of the region A is greater than or equal to the height of the region B. When the height of the region A is smaller than the height of the region B (Step S29a: No), the processing transits to Step S71. When the height of the region A is greater than or equal to the height of the region B (Step S29a: Yes), the processing transits to Step S30.

[Step S71] The movement detection unit 14i extracts, as a region F, a region when the region A is minimally moved so that at least two sides from among four sides of the region A have contact with the sides of the region B. After that, the processing transits to Step S72. In addition, the region A3 illustrated in FIG. 23B is an example of the region F.

[Step S72] The movement detection unit 14i calculates the area $S_x$ of the overlapping region of the region A and the region F. After that, the processing transits to Step S73.

[Step S73] The movement detection unit 14i determines whether or not the area $S_x$ calculated in Step S72 is greater than "0". When the area $S_x$ is greater than "0" (Step S72: Yes), the processing transits to Step S74. When the area $S_x$ is less than or equal to "0" (Step S72: No), the processing transits to Step S26.

[Step S74] The movement detection unit 14i continuously uses the region A in order to send the screen data of the region B. Specifically, the movement detection unit 14i extracts a region (a region difficult to transmit only using the continuous use of the region A) in the region B, which does not overlap with the region F. Since at least two sides of the region B have contact with the sides of the region F, this region results in one region or two regions. After that, the processing transits to Step S75. In addition, the regions A4 and A5 illustrated in FIG. 23B are example of two regions that do not overlap.

[Step S75] The movement detection unit 14i newly creates the frequently updated region for sending the image of the extracted region that does not overlap. In addition, the movement detection unit 14i stores the region management data of the created frequently updated region in the region management table 144. After that, the processing transits to Step S76.

[Step S76] The movement detection unit 14i stores the ID of the region B in the field of the continuous-use-destination region ID of the region A of the previous region management table 142. Furthermore, the movement detection unit 14i stores the position information (x, y) of the region F in the fields of nx and ny of the region A. After that, the processing transits to Step S77.

[Step S77] The movement detection unit 14i defines the region B and the region newly registered in Step S74 as integration targets. In addition, the movement detection unit 14i sets a time, obtained by adding a predetermined period of time to a current time, in the field of the integration instruction time of the previous region management table 142. After that, the processing returns to Step S23.

According to the above-mentioned processing, even if the new frequently updated region is larger than the previous frequently updated region, it is possible to detect the movement thereof as a target to be continuously used, and it is possible to record information in the region management data, the information being used for integrating regions segmented so as to further continuously use the frequently updated region.

Next, the integration processing of the frequently updated region, performed in the server device 10 of the fourth embodiment, will be described.

Figure 27:
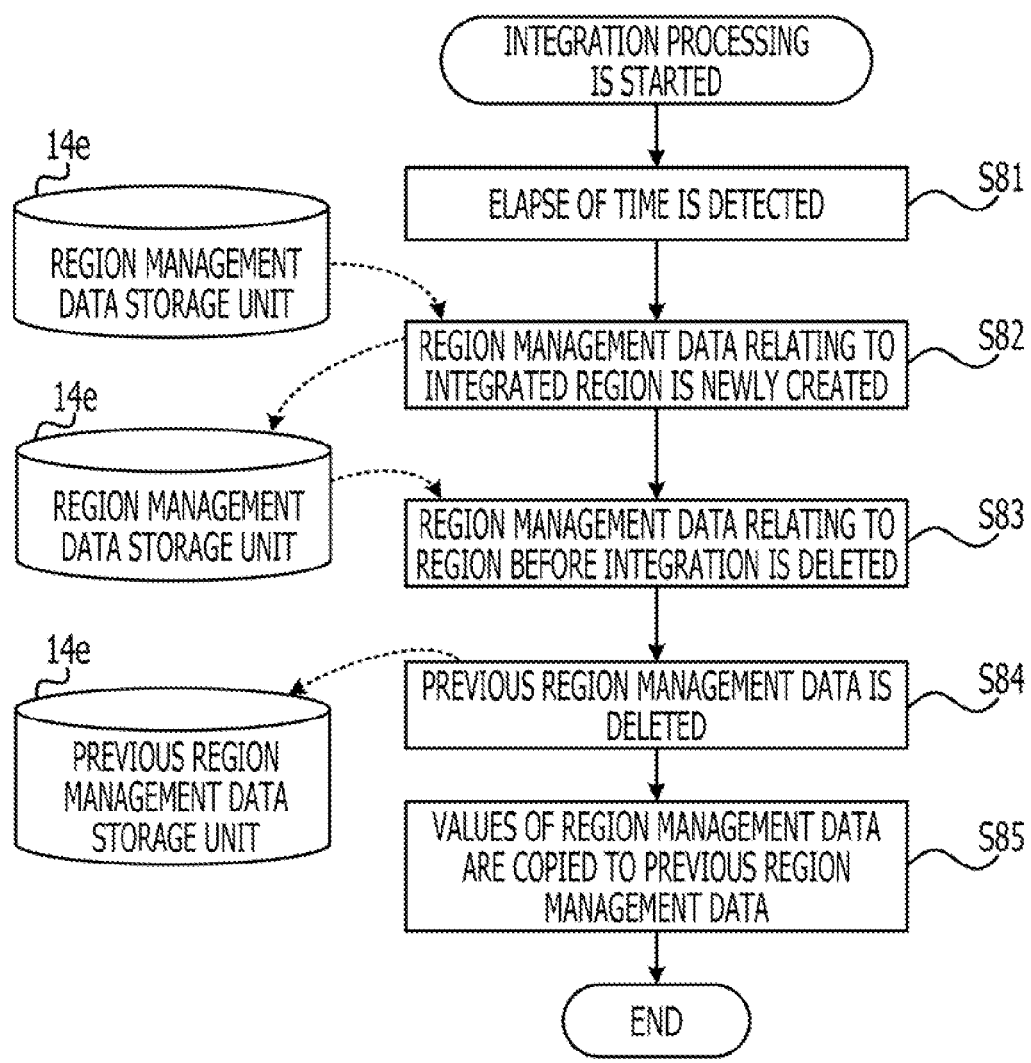
FIG. 27 is a flowchart illustrating a procedure of integration processing of a frequently updated region in the server device of the fourth embodiment.

FIG. 27 is a flowchart illustrating a procedure of the integration processing of the frequently updated region in the server device of the fourth embodiment.

FIG. 27 illustrates a procedure performed until the segmented frequently updated regions are integrated when a time has elapsed that is set in the field of the integration instruction time by the server device 10 in Step S77.

[Step S81] When the movement detection unit 14i has detected the elapse of the time set in Step S77, the processing transits to Step S82.

[Step S82] The movement detection unit 14i refers to the region management data stored in the region management table 144, and newly creates the region management data relating to a region into which frequently updated regions are integrated, the frequently updated regions being the targets of a timer that has timed out. After that, the processing transits to Step S83.

[Step S83] The movement detection unit 14i deletes the region management data relating to a region before the integration, stored in the region management table 144. After that, the processing transits to Step S84.

[Step S84] The movement detection unit 14i deletes the previous region management data stored in the previous region management table 142. After that, the processing transits to Step S85.

[Step S85] The movement detection unit 14i copies the region management data stored in the region management table 144 to the previous region management table 142. After that, the integration processing is terminated.

This is the end of the description of the integration processing.

According to the information processing system of the fourth embodiment, substantially the same advantageous effect as that of the information processing system of the second embodiment is obtained.

In addition, according to the information processing system of the fourth embodiment, after the elapse of a predetermined period of time, it is possible to change a region, segmented so as to continuously use the frequently updated region, so that an image is transmitted with being regarded as one region. Therefore, the image becomes substantially seamless and it is possible to substantially improve image quality.

In addition, the processing performed in the server device 10 may also be subjected to distributed processing by a plurality of devices. For example, after one device has generated region position identification data by performing processing until the identification processing of the updated region, another device may perform the movement detection processing and the image transmission processing using the region position identification data.

While, as above, the information processing device, the information processing method, and the information processing program of the present invention have been described on the basis of the illustrated embodiments, the present invention is not limited to these embodiments, and the configurations of individual units may be replaced with arbitrary configurations having similar functions. In addition, another arbitrary component or another arbitrary process may be added to the present invention.

In addition, the present invention may also be the combination of more than one arbitrary configuration (feature) from among the above-mentioned individual embodiments.

In addition, the above-mentioned processing functions may be realized by a computer. In this case, a program is provided that describes the processing contents of functions individually included in the information processing device 1, the server device 10, the client devices 2 and 20. The computer executes that program, and hence the above-mentioned processing functions are realized on the computer. The program describing the processing contents may be recorded in a recording medium readable for the computer. As examples of the computer-readable recording medium, a magnetic storage device, an optical disk, a magneto-optical recording medium, a semiconductor memory, and the like may be cited. As examples of the magnetic storage device, a hard disk drive, a flexible disk (FD), a magnetic tape, and the like may be cited. As examples of the optical disk, a DVD, a DVD-RAM, a CD-ROM/RW, and the like may be cited. As examples of the magneto-optical recording medium, a magneto-optical disk (MO) and the like may be cited.

When the program is distributed, portable recording media such as DVDs, CD-ROMs, and the like, in which the program is recorded, are marketed, for example. In addition, the program may be stored in a storage device in a server computer, and the program may also be transferred from the server computer to another computer through a network.

The computer executing the program stores, in the self-storage device, the program recorded in the portable recording medium or the program transferred from the server computer, for example. In addition, the computer reads out the program from the self-storage device and executes processing according to the program. In addition, the computer may also directly read out the program from the portable recording medium and execute processing according to the program. In addition, every time the program is transferred from the server computer connected through the network, the computer may also sequentially execute processing according to the received program.

In addition, at least part of the above-mentioned processing functions may also be realized using an electronic circuit such as a digital signal processor (DSP), an ASIC, a programmable logic device (PLD), or the like.

In view of such points, the present invention is made, and an object thereof is to provide an information processing device, an information processing method, and an information processing program that substantially reduce the amount of transmitted information.

According to the information processing device and the information processing method of the above-mentioned embodiments, it is possible to substantially reduce the amount of transmitted information.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments of the present inventions have been described in detail, it should be understood that the various changes, substitutions, and alterations could be made hereto without departing from the spirit and scope of the invention.

What is claimed is:

1. An information processing device comprising:
a storage unit storing information indicating a first region subjected to moving-image compression and transmission;
an identification unit identifying a second region where the update amount of an image is greater than or equal to a threshold value;
a determination unit determining whether the image of the second region being associated with the moving image of the first region is to be transmitted, based on an overlapping relationship between the first region and the second region; and
a transmission unit transmitting an image of a region including at least a portion of the second region, following the transmission of the image of the first region, with the image of the region being subjected to moving-image compression, and transmitting information indicating a display position of the image subjected to moving-image compression, when it is determined that the second region is to be transmitted with being associated with the first region.

2. The information processing device according to claim 1, wherein when the first region is equal in area to the second region and an overlapping region exists between the first region and the second region, the determination unit determines that the image of the second region being associated with the moving image of the first region is to be transmitted.

3. The information processing device according to claim 2, wherein the transmission unit transmits a whole image of the second region, following the image of the first region, with the whole image of the second region being subjected to moving-image compression.

4. The information processing device according to claim 2, wherein when the area of the second region is smaller than the area of the first region and a data amount, obtained when the image of a region including the overlapping region is subjected to moving image compression following the image of the first region, is smaller than a data amount obtained when moving image compression is performed a leading portion of which corresponds to the image of the second region, the determination unit determines that the image of the second region being associated with the moving image of the first region is to be transmitted.

5. The information processing device according to claim 4, further comprising:
a counting unit counting the number of times the image of the second region is transmitted as a moving image following the image of the first region, wherein
when the number of times counted by the counting unit is greater than or equal to a preliminarily prepared number of times, the determination unit discontinues the transmission of the image of the second region, associated with the moving image of the first region.

6. The information processing device according to claim 1, wherein the identification unit segments an image, stored in an image storage unit storing a plurality of the images, into a plurality of regions, judges the frequency of update with respect to each of the regions, and identifies, as the second region, a region where the frequency of update is greater than or equal to a constant value.

7. The information processing device according to claim 1, wherein when the area of the second region is larger than the area of the first region and an overlapping region between the first region and the second region exists, the determination unit determines that the image of the second region being associated with the moving image of the first region is to be transmitted.

8. The information processing device according to claim 4, wherein the transmission unit transmits an image of a region that includes the second region and is equal in area to the first region, following the image of the first region, with the image of the region being subjected to moving-image compression.

9. The information processing device according to claim 1, wherein
when the area of the second region is larger than the area of the first region and an overlapping region between the first region and the second region exists, the determination unit determines that the image of the second region being associated with the moving image of the first region is to be transmitted.

10. The information processing device according to claim 8, wherein
when a time period for which the image of the second region is transmitted as a moving image following the image of the first region has exceeded a certain period of time, the transmission unit transmits a moving image whose leading image is the image of the second region.

11. The information processing device according to claim 8, wherein
the transmission unit transmits a portion of the image of the second region as a moving image following the image of the first region.

12. A method in which a computer executes information processing, the method comprising:
storing information indicating a first region subjected to moving-image compression and transmission;
identifying a second region where the update amount of an image is greater than or equal to a threshold value;
determining whether the image of the second region being associated with the moving image of the first region is to be transmitted, based on an overlapping relationship between the first region and the second region; and
transmitting an image of a region including at least a portion of the second region, following the transmission of the image of the first region, with the image of the region being subjected to moving-image compression, and transmitting information indicating a display position of the image subjected to moving-image compression, when it is determined that the second region is to be transmitted with being associated with the first region.

13. A non-transitory computer-readable recording medium that stores a program for causing a computer to execute a process comprising:
storing information indicating a first region subjected to moving-image compression and transmission;
identifying a second region where the update amount of an image is greater than or equal to a threshold value;
determining whether the image of the second region being associated with the moving image of the first region is to be transmitted, based on an overlapping relationship between the first region and the second region; and
transmitting an image of a region including at least a portion of the second region, following the transmission of the image of the first region, with the image of the region being subjected to moving-image compression, and transmitting information indicating a display position of the image subjected to moving-image compression, when it is determined that the second region is to be transmitted with being associated with the first region.

* * * * *